US008676621B1

(12) United States Patent
Helfrich et al.

(10) Patent No.: US 8,676,621 B1
(45) Date of Patent: Mar. 18, 2014

(54) SYSTEM AND METHOD FOR MANAGING REQUESTS FOR POOLED RESOURCES DURING NON-CONTENTION

(75) Inventors: Brian Helfrich, Seattle, WA (US); David Nunnerley, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/247,846

(22) Filed: Sep. 28, 2011

(51) Int. Cl.
*G06Q 10/00* (2012.01)
*G06Q 40/00* (2012.01)

(52) U.S. Cl.
USPC .......................................... 705/7.12; 705/37

(58) Field of Classification Search
USPC .................................................... 705/35–45
See application file for complete search history.

(56) References Cited

U.S. PATENT DOCUMENTS

| | | |
|---|---|---|
| 6,532,284 B2 | 3/2003 | Walker et al. |
| 7,290,009 B1 | 10/2007 | Semret et al. |
| 7,437,323 B1 | 10/2008 | Valvok et al. |

*Primary Examiner* — Thomas M Hammond, III
(74) *Attorney, Agent, or Firm* — Robert C. Kowert; Meyertons, Hood, Kivlin, Kowert & Goetzel, P.C.

(57) ABSTRACT

A computer system that provides pooled computing resources to clients may receive requests for resources, each of which includes a bid amount. While the supply of resources exceeds the demand, the system may adaptively determine a theoretical bid threshold for the resource pool that represents the predicted value of the lowest bid amount for which corresponding requests will be granted when demand for the resources exceeds supply. The determination may be dependent on a distribution of the bid amounts included in the requests for resources. The system may adaptively determine the lowest bid amount for which corresponding ones of the requests will be granted during non-contention dependent on changes in demand for the resources, the total capacity of the resource pool, and the theoretical bid threshold value, and may grant requests that include higher bid amounts. The use of some resources may be terminated in response to changes in demand.

15 Claims, 19 Drawing Sheets

US 8,676,621 B1

SYSTEM AND METHOD FOR MANAGING REQUESTS FOR POOLED RESOURCES DURING NON-CONTENTION

BACKGROUND

Some systems that provide services to customers (including access to computing resources) provide "spot instances" of those resources through various resource pools. Different resource pools may include instances of different types of resources and/or resources having different capabilities and/or performance specifications. Systems that provide spot instances typically allow customers to submit a resource request in order to bid on the use of any unused capacity in a resource pool. If the request is granted, the requested resource instance (or instances) may be allocated to the customer as long as the bid amount included in the request (i.e. the maximum price the customer is willing to pay per instance hour) exceeds the current spot price.

In some cases, the customer may pay less per hour for a resource instance than the bid amount included in the resource request. For example, if the request is granted, the customer may be charged the current spot price, regardless of the bid amount included in the request. However, the customer may never pay more than the bid amount included in the request. Instead, any resource instances allocated to the customer may be revoked (e.g., the resource instances may be terminated) if the spot price rises above the bid amount included in the request.

In some systems, the spot pricing approach that is applied during periods of contention for resources (e.g., when demand exceeds supply) may be different than the spot pricing approach that is applied during periods of non-contention (e.g., when supply is greater than demand). For example, a standard spot pricing model for the non-contention scenario is to apply a default spot price or a minimum spot price that is reflective of operating costs.

Figure 1:
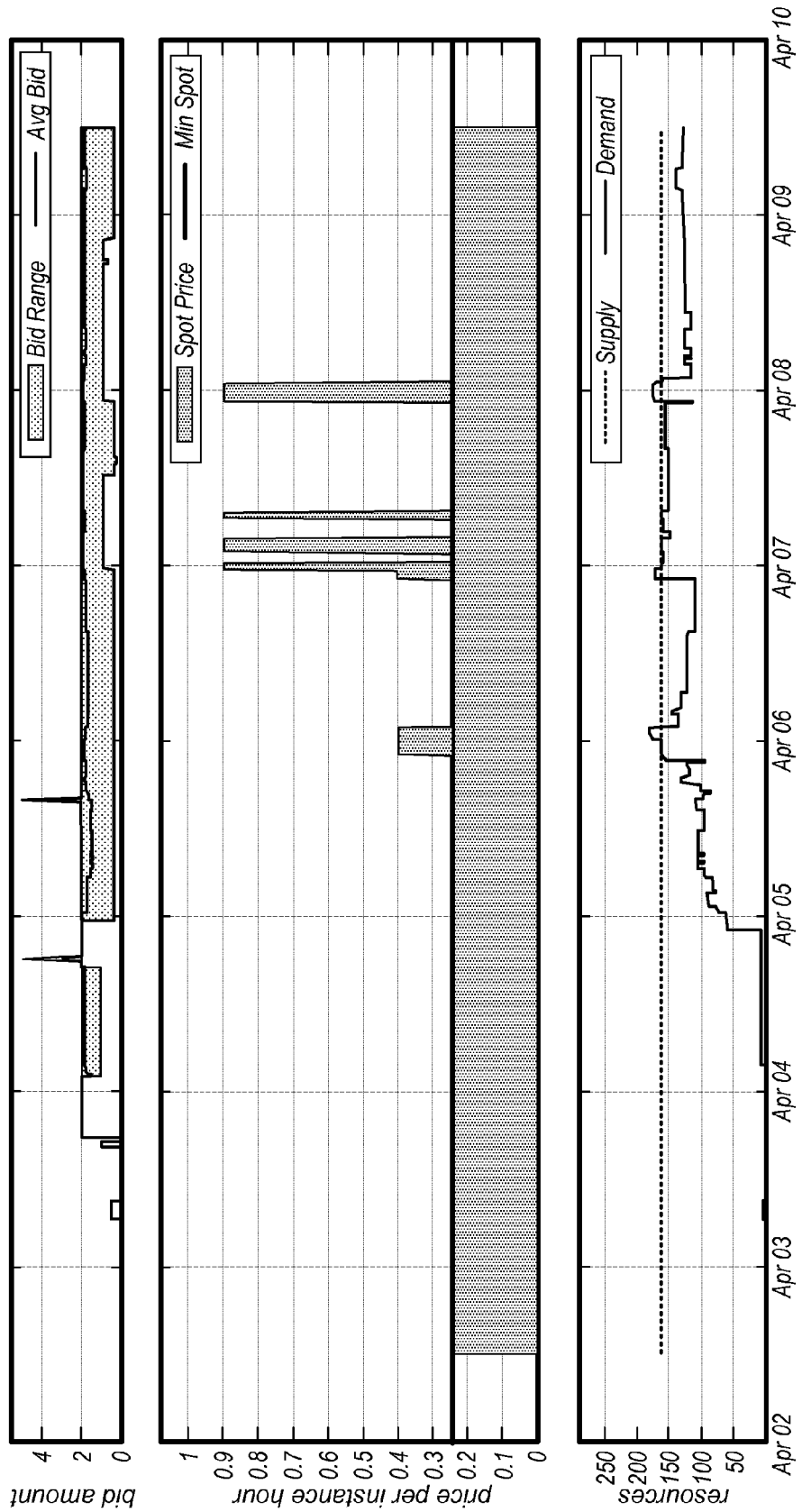
FIG. 1 illustrates an example of the behavior of a standard pricing model during times of contention and non-contention for pooled resources.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

The computer systems described herein for providing services (including access to pools of computing resources) to clients may in some embodiments be configured to adaptively determine which and/or how many requests for resource instances are granted and/or terminated by the system (or service) as demand changes, and to determine the prices that clients will be charged for the use of those resource instances if and when their requests are granted. The systems may incrementally adjust the lowest bid amount for which corresponding resource requests will be granted in response to changes in demand, even when the supply of resource instances exceeds the demand for those resource instances (i.e. even during periods of non-contention).

During periods of non-contention, a typical spot pricing model may simply apply a minimum spot price to all resource requests, regardless of the specific level of demand with respect to supply (e.g., total or remaining capacity of the resource pool). This minimum spot price may in some cases be reflective of operating costs for the resource pool. However, simply setting the spot price to a minimum value in this scenario has some down sides. For example, while demand is less than supply, minimal information about the supply vs. the demand is reflected in the spot price, other than demand is probably less than supply. In this scenario, customers are given minimal data with which to formulate bidding strategies that would help them achieve their goals using spot instances. In addition, it may appear to potential customers as if no one is using the spot instances, which may discourage them from using them themselves. In some cases, a standard non-contention pricing model may apply a small amount of "jitter" to the spot price, e.g., to avoid the appearance that no one is bidding for use of the resources. Furthermore, as demand approaches and then exceeds supply, the spot price that started low and flat can immediately jump to the minimum price under a contention pricing model, which could be relatively high. Such behavior may give an impression of high price volatility for the resource pool, which may dissuade customers from using spot instances.

In some embodiments, the systems described herein may apply a new type of pricing model to spot instances during non-contention that takes into consideration the actual supply and demand during non-contention. In other words, these systems may calculate the non-contention spot price as a function of supply and demand. Specifically, these systems may calculate the non-contention spot price as a function of the remaining available resource instances and a prediction of the contention spot price, modeled on existing (e.g., running and open) bids. The new non-contention pricing model may in some embodiments provide customers (and/or potential customers) with supply vs. demand information with which to inform their bidding strategies, and may minimize the cost to the customer for that information. For example, a customer (or potential customer) may access data indicating recent spot prices for various resource pools (e.g., historical price curves for the last day, week, or month) and this information (which may more accurately reflect the changing relationships between supply and demand over the reported period than that provided by a system that employs standard non-contention pricing) may inform their bidding strategies.

FIG. 1 illustrates an example of the behavior of a standard pricing model during times of contention and non-contention. In this example, three stacked graphs are used to illustrate the changes in supply and demand for a pool of resource instances over a one-week time period, the price curve resulting from the standard pricing model over that time period, and the bidding behavior of clients during that time period. For example, the bottom chart illustrates that the supply of resources was on the order of 160 resource instances during the time period depicted in the chart, and that the demand for those resources varied from near zero to between 160 and 200 resource instances. As illustrated in this chart, the resource pool was operating in a non-contention state for most of the week. More specifically, demand began very low, rose steadily from April $5^{th}$ to April $6^{th}$, and only exceeded supply for a few brief periods on or about April $6^{th}$, $7^{th}$, and $8^{th}$. After the initial rise in demand, demand levels remained above 100 resource instances for the rest of the week.

As illustrated by the middle chart in FIG. 1, the standard pricing model produced a price curve in which the price per instance hour was held to a non-contention minimum spot price of about $0.25 while demand increased, then was raised in response to demand exceeding supply on or about April $6^{th}$, according to a contention pricing model. When demand fell below supply later on April $6^{th}$, the spot price was reduced back to the non-contention minimum spot price, despite the fact that demand was still relatively high. For the rest of the week, the spot price was set at the non-contention minimum spot price during all periods of non-contention (regardless of the demand) and was allowed to spike during times of contention. The upper chart illustrates that over this time period, the range of bid amounts included in resource requests was generally between $0.25 and $2.00, and the average bid amount was typically slightly less than $2.00.

Figure 2:
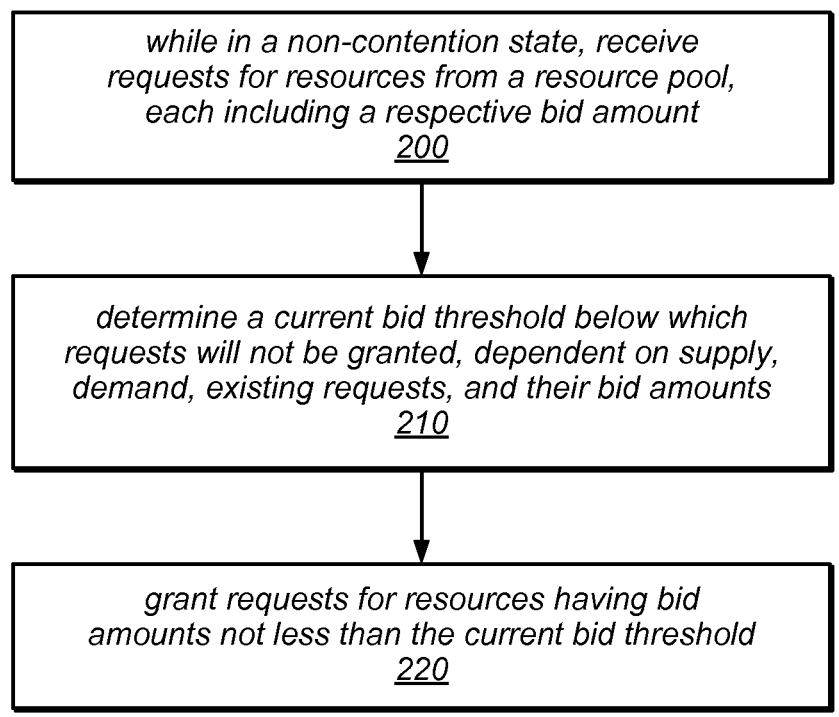
FIG. 2 is a flow diagram illustrating one embodiment of a method for granting access to pooled resources while in a non-contention state.

One embodiment of a method for granting access to pooled resources while in a non-contention state (i.e. while the supply of the pooled resources exceeds the demand for those resources) is illustrated by the flow diagram in FIG. 2. In this example, the method may include a system that provides access to one or more pools of computing resources as a service receiving requests (e.g., from clients of the service) for resources from a particular resource pool, each of which includes a respective bid amount, as in 200. The bid amount may represent the maximum price that the client (or requestor) is willing to pay to use the requested resource (e.g., per resource instance hour). Note that in various embodiments, the request may also include an identifier of the client (requestor), an identifier of a resource pool, an identifier the type of resource (or resource instance) requested, an indication of the number of resource instances being requested, and/or other information.

As illustrated in this example, the method may include determining a current non-contention bid threshold (sometimes referred to herein simply as a current bid threshold) below which resource requests will not be granted (i.e. the lowest bid amount for which corresponding ones of the requests for resources will be granted), as in 210. In other words, the current non-contention bid threshold may represent the current spot price for an instance of the requested resource. In various embodiments, the determination of the current non-contention bid threshold may be dependent on (or calculated as a function of) the current supply of resources in the resource pool, the current demand for those resources, the existing requests (both pending requests and those that have been granted and for which resources are currently in use), and/or on the bid amounts included in those existing requests. In some embodiments, the determination of the current non-contention bid threshold may also be dependent on a minimum spot price (e.g., a minimum spot price based on operating costs).

In this example, only requestors whose requests include a bid amount greater than or equal to the current non-contention bid threshold may be granted access to respective instances of those resources, as in 220. Note that in some embodiments, the current spot price may be set to the current non-contention bid threshold amount, and this amount (rather than a bid amount included in a request) may be the price that requestors who are granted access to a requested resource pay for the use of that resource.

Note that in various embodiments, the techniques described herein for determining which and/or how many requests for resource instances are granted and/or terminated by the system (or service) as demand changes, and for determining the prices that clients will be charged for the use of those resource instances if and when their requests are granted may be applied to resource request data that is captured during a particular window in time, e.g., for a running collection of resource requests (e.g., those that have been received and are open and those that currently being serviced). In some such embodiments, information included in a collection of resource requests (e.g., an identifier of the client/requestor, an identifier of a resource pool, an identifier the type of resource instance being requested, an indication of the number of resource instances being requested, a bid amount, and/or other information) may be captured as the requests are received, and this data may be analyzed on a periodic basis to recalculate various bid thresholds and/or spot prices, as described herein. For example, such an analysis may be performed once every minute. In other embodiments, such an analysis may be performed in response to receiving a resource request, or in response to having received a pre-determined number of requests for resources in a particular resource pool. In some embodiments, bid thresholds and/or spot prices may be adjusted less frequently than the analysis is performed (e.g., no more often than once every five minutes) regardless of how often an analysis of the request data is performed. This may avoid excessive price thrashing during periods of non-contention.

Figure 3:
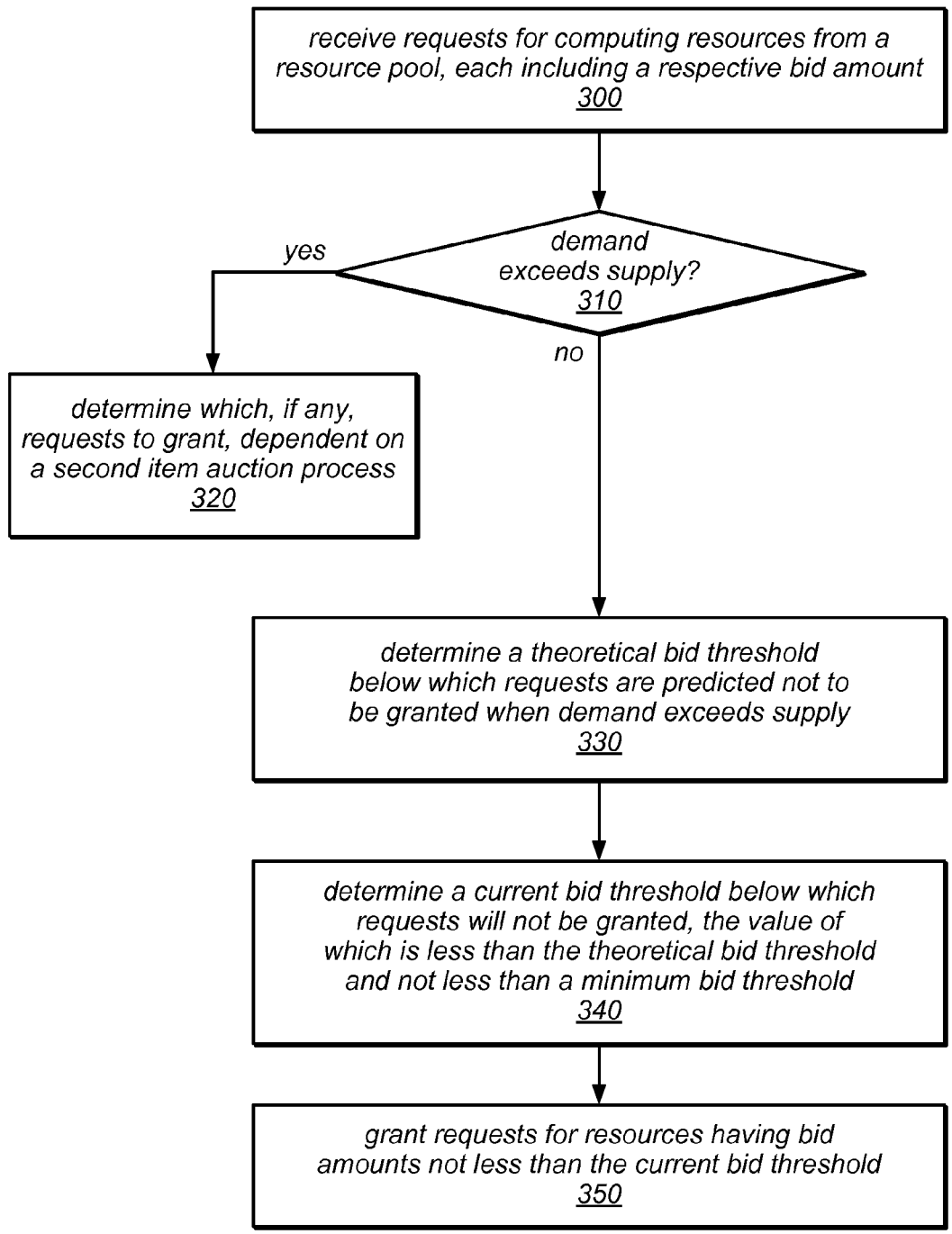
FIG. 3 is a flow diagram illustrating one embodiment of a method for granting access to pooled resources while in a non-contention state, dependent on a theoretical bid threshold.

One embodiment of a method for granting access to pooled resources while in a non-contention state dependent on a theoretical bid threshold is illustrated by the flow diagram in FIG. 3. As illustrated at 300 in this example, the method may include the system (or service) receiving requests for computing resources from a resource pool maintained by the system (or service), each of which includes a respective bid amount. As in the previous example, the request may also include an identifier of the client (requestor), an identifier of a resource pool, an identifier the type of resource (or resource instance) requested, an indication of the number of resource instances being requested, and/or other information, in some embodiments.

If (as shown by the positive exit from 310) the current demand for the resources (e.g., the number of resource instances currently in use plus the number of resource instances requested in any open requests) exceeds the current supply of resource instances (i.e. the total capacity of the resource pool), the system (or service) may determine which, if any, requests to grant dependent on a second item auction process or another contention pricing/bidding model (as in 320). In other words, during times of contention for the pooled resources, any of a variety of contention pricing models may be employed, in different embodiments.

Figure 5:
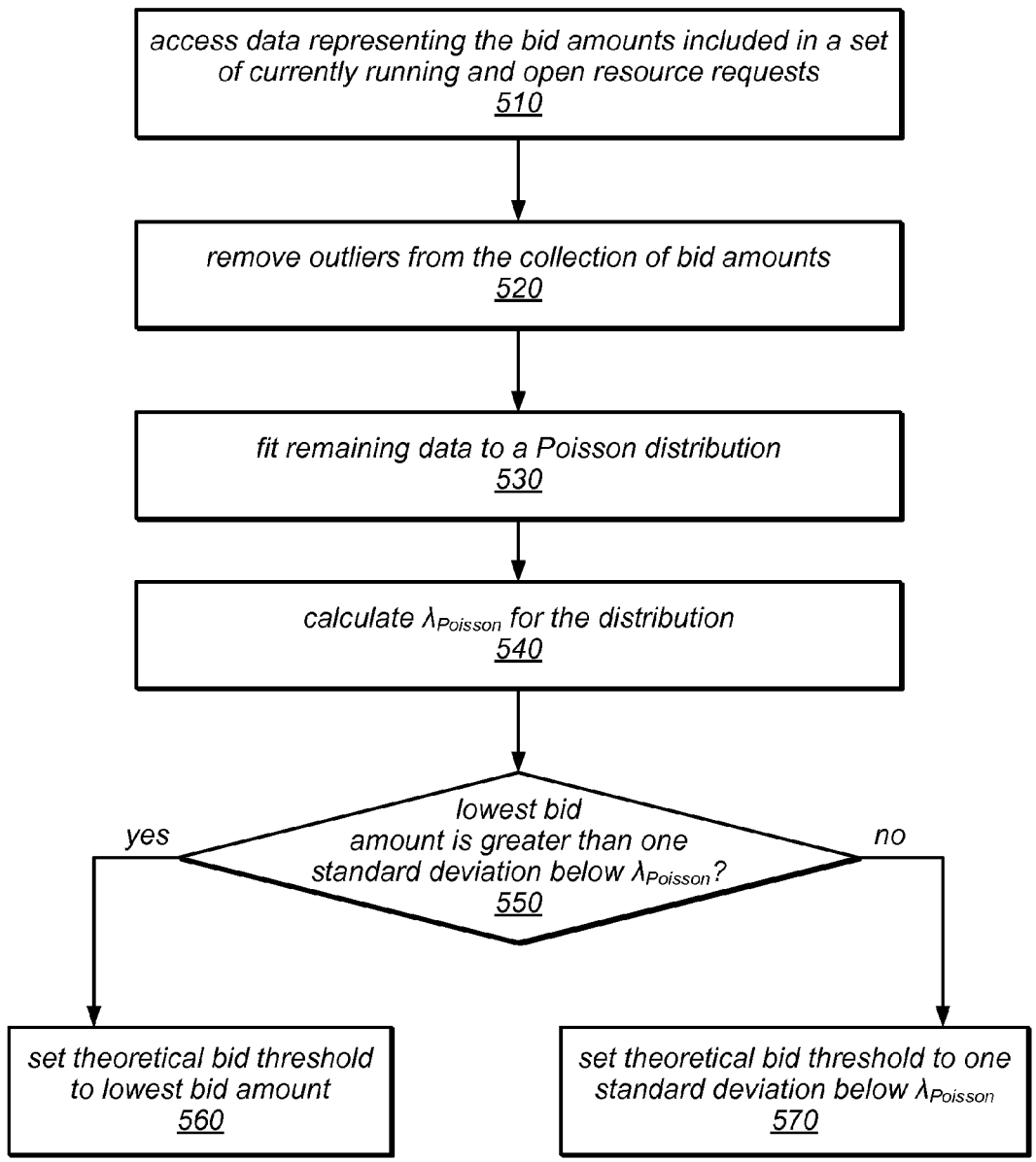
FIG. 5 is a flow diagram illustrating one embodiment of a method for determining a theoretical bid threshold.

If, however, the current demand for the resources does not exceed the current supply of resource instances (shown as the negative exit from 310), a non-contention pricing model may be applied to determine which, if any, resource requests are granted. As illustrated in this example, the method may include determining a theoretical bid threshold below which requests are predicted not to be granted when demand exceeds supply, as in 330. In other words, the method may include predicting the spot price at the point at which an increasing demand for the resources in a given resource pool reaches (and then surpasses) the supply of those resources. In some embodiments, determining the theoretical bid threshold may be dependent on the bid amounts included in the resource requests. One embodiment of a method for determining a theoretical bid threshold is illustrated in FIG. 5 and described below.

As illustrated in this example, the method may include determining a current bid threshold below which resource requests will not be granted, as in 340. As in the previous example, the current bid threshold may represent the current spot price for an instance of the requested resource. In this example, the value of the current bid threshold may be less than the theoretical bid threshold, but not less than a minimum bid threshold. In various embodiments, such a minimum bid threshold may represent a minimum spot price based on operating costs, a lowest bid amount among the bid amounts included in the existing resource requests, or some other value. In various embodiments, the determination of the current bid threshold may be dependent on (or calculated as a function of) the theoretical bid threshold, the current supply of resources in the resource pool, the current demand for those resources, the existing requests, the bid amounts included in those existing requests and/or the minimum bid threshold.

In this example, only requestors whose requests include a bid amount greater than or equal to the current bid threshold may be granted access to respective instances of those resources, as in 350. As in the previous example, the current spot price may be set to the current bid threshold amount, and this amount (rather than a bid amount included in a request) may be the price that requestors who are granted access to a requested resource pay for the use of that resource.

In some embodiments, the systems described herein may determine non-contention pricing based on a theoretical bid threshold as follows. Given the following inputs:

A collection B of n bids (e.g., bid amounts included in requests currently being serviced and in any open requests), where $B=\{B_1, B_2, B_3 \ldots B_n\} | B_i \geq B_{i+1}$ (i.e. the bids are sorted in descending order The resource pool capacity C (aka supply), and A minimum spot price $S_{min}$ The system may be configured to calculate $T_{theo}$, (i.e. the target spot price or the price predicted for the point at which the demand and supply curves cross), and a non-contention spot price $S_{nc}$ (as a function of C, $T_{theo}$, and B).

In some embodiments, the system may be configured to equilibrate a spot price $S_{nc}$ determined as described above in order to mitigate a price rise that would cause terminations of resource allocations to requests currently being serviced (and which could, in turn, cause a price drop). This operation may employ a copy of the current bids state B'. In some embodiments, the operation may include setting a candidate spot price $S'_{nc}=S_{nc}$, and then, while there are running bids (i.e. bid amounts in requests that are currently being serviced) that are lower than the candidate spot price $S'_{nc}$, and therefore the corresponding resource allocations are at risk of being terminated, (i.e. while there are running bids and the smallest running bid $B_n^{running} < S'_{nc}$):

Removing $B_n^{running}$ from the copy of the bids state B' (i.e. removing the lowest running bid amount from consideration)

Calculating a new target spot price $T'_{theo}$ given the new bids state B'

Calculating a new candidate spot price $S'_{nc}$ given C, $T'_{theo}$, and B'

In this example, removing the lowest bid amount and recalculating the target spot price and the candidate spot price may be repeated until there are no more running bids that are lower than the candidate spot price. Once there are no more running bids that are lower than the candidate spot price, the spot price may be set to the candidate spot price:

$$S=S'_{nc}.$$

The techniques described herein for determining and then equilibrating a non-contention spot price may be further illustrated using the following example. In this example (data for which is illustrated in the table below), three iterations are required to set the non-contention spot price to a value at which no resource allocations to requests currently being serviced will be terminated. In the initial iteration, the collection of bid amount values includes five values, $0.50, $0.40, $0.30, $0.21, and $0.20. In this example, the theoretical bid threshold is calculated to be $0.30 and the spot price is calculated to be $0.27. Since two of the bid amount values in the running bid state are lower than the calculated spot price of $0.27, the resource allocations for the requests corresponding to those bid amounts are at risk of termination. However, an operation to equilibrate the spot price is performed, as follows.

In this example, the candidate spot price is first set to the value of the initially calculated spot price of $0.27. In the first iteration, the lowest bid amount ($0.20) is removed from the running bid state, and new values are calculated for the theoretical bid threshold ($0.32) and the candidate spot price ($0.23). However, there is still one bid amount in the running bid state that is lower than this new candidate spot price. In the second iteration, that bid amount ($0.21) is removed from the running bid state, and new values are calculated for the theoretical bid threshold ($0.35 and the candidate spot price ($0.20). At this point, there are no longer any bid amounts in the running bid state that are lower than the new candidate spot price. Therefore, the spot price may be set to $0.20 without any risk that resource allocations to requests currently being serviced will be terminated.

| iteration | $B^{running}_n <$ $S'_{nc}$? | running bid state B' ($) | $T_{theo}$ | $T'_{theo}$ | $S_{nc}$ | $S'_{nc}$ |
|---|---|---|---|---|---|---|
| initial | true | (0.50, 0.40, 0.30, 0.21, 0.20) | 0.30 | — | 0.27 | 0.27 |
| 1 | true | (0.50, 0.40, 0.30, 0.21) | 0.30 | 0.32 | 0.27 | 0.23 |
| 2 | false | (0.50, 0.40, 0.30) | 0.30 | 0.35 | 0.27 | 0.20 |

Figure 4:
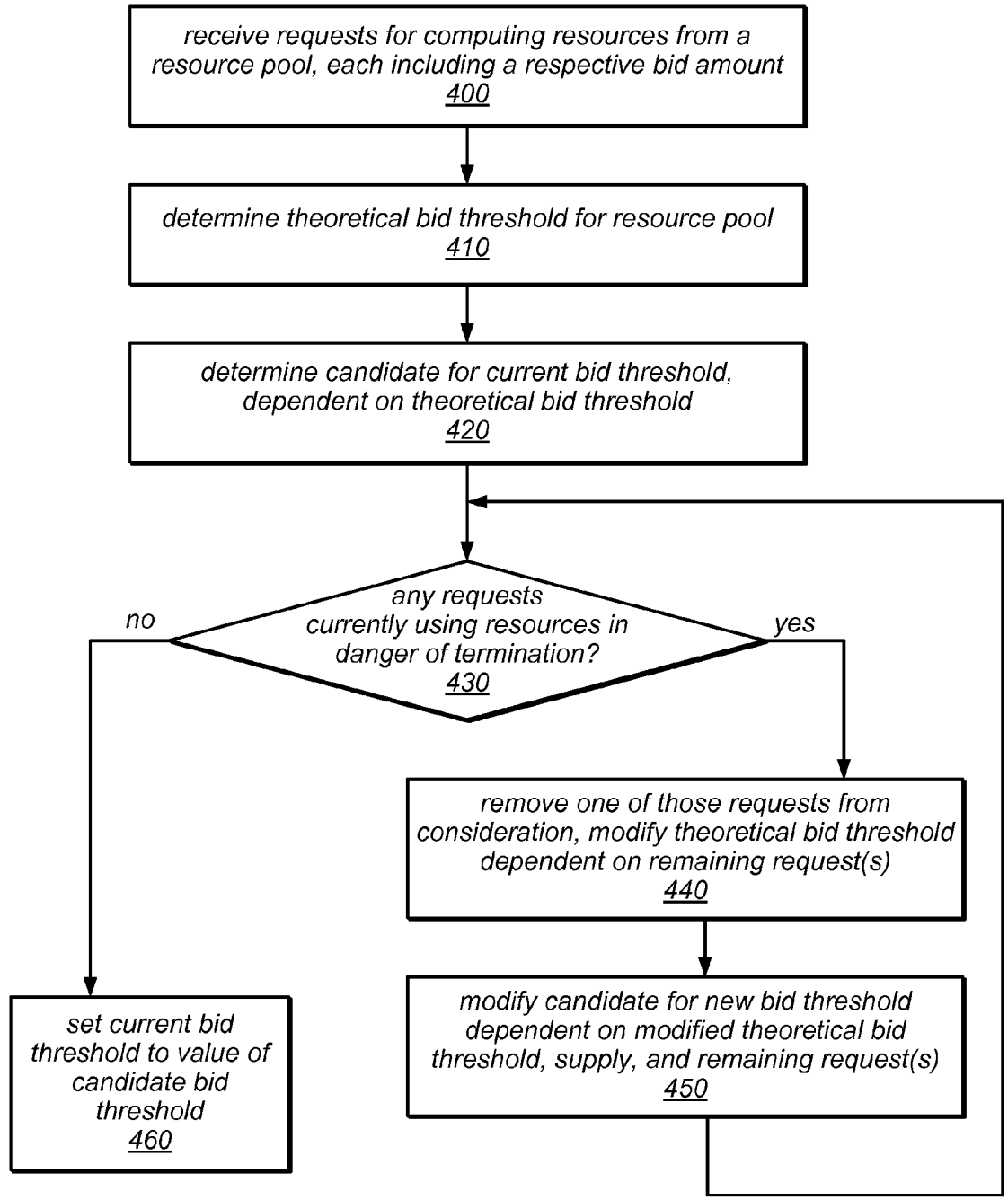
FIG. 4 is a flow diagram illustrating one embodiment of a method for determining non-contention pricing for resource instances that mitigates the termination of existing resource allocations.

One embodiment of a method for determining non-contention pricing for resource instances that mitigates the termination of existing resource allocations is illustrated by the flow diagram in FIG. 4. As illustrated at 400 in this example, the method may include the system (or service) receiving requests for computing resources from a resource pool maintained by the system (or service), each of which includes a respective bid amount. As in previous examples, the request may also include an identifier of the client (requestor), an identifier of a resource pool, an identifier the type of resource (or resource instance) requested, an indication of the number of resource instances being requested, and/or other information, in some embodiments. In this example, it is assumed that the system is operating in a non-contention state (i.e. that the current demand for the resources does not exceed the current supply of resource instances).

As illustrated in this example, the method may include determining a theoretical bid threshold for the resource pool below which requests are predicted not to be granted when demand exceeds supply, as in 410. In some embodiments, determining the theoretical bid threshold may be dependent on the bid amounts included in the resource requests. One embodiment of a method for determining a theoretical bid threshold is illustrated in FIG. 5 and described below.

As illustrated at 420, the method may include determining a candidate for a current bid threshold, below which resource requests will not be granted, dependent on the theoretical bid threshold. In some embodiments, the candidate bid threshold may represent a candidate for a new spot price for an instance of the requested resource. In some embodiments, the value of the candidate bid threshold may be less than the theoretical bid threshold, but not less than a minimum bid threshold. In various embodiments, the determination of the candidate bid threshold may be dependent on (or calculated as a function of) the theoretical bid threshold, the current supply of resources in the resource pool, the current demand for those resources, the existing requests, the bid amounts included in those existing requests and/or the minimum bid threshold.

If any requests to which resources are currently allocated would be in danger of termination if the candidate bid threshold were adopted, shown as the positive exit from 430, the method may include removing one of those requests from consideration, and modifying the theoretical bid threshold dependent on the remaining requests, as in 440. For example, if any requests to which resources are currently allocated include a bid amount that is lower than the candidate bid threshold, the one of those requests that includes the lowest bid amount may be removed from consideration, and the theoretical bid threshold may be recalculated as if that request did not exist. In other words, the low bid amount included in the request may not be included in the input data used to calculate the modified theoretical bid threshold. The method may also include modifying the candidate for the new bid threshold, dependent on the modified theoretical bid threshold, the current supply, and the remaining requests, as in 450.

Following the modification of the theoretical bid threshold and the candidate bid threshold in 450, if there are still requests to which resources are currently allocated that would be in danger of termination if the modified candidate bid threshold were adopted, the method may include repeating the operations illustrated at 440 and 450 (e.g., further removing requests and modifying the theoretical bid threshold and the candidate bid threshold) until there are no requests to which resources are currently allocated that would be in danger of termination if the modified candidate bid threshold were adopted. This is shown as the feedback loop from 450 to 430 and back to 440, in FIG. 4. If there were no requests to which resources are currently allocated that would be in danger of termination if the original candidate bid threshold were adopted, or if the modified candidate bid threshold were adopted (in the case that such modification were made), the method may include setting the current bid threshold to the current value of the candidate bid threshold, as in 460. As previously noted, in some embodiments, the current spot price may be set to this current bid threshold amount, and this amount (rather than a bid amount included in a request) may be the price that requestors who are granted access to a requested resource pay for the use of that resource.

As noted above, in some embodiments, to enable the calculation of a representative spot price given that demand is less than supply, the systems described herein may first calculate a theoretical bid threshold $T_{theo}$, i.e. a prediction of what the spot price will be when the demand curve crosses the supply curve.

One way to address the calculation of $T_{theo}$ would be to assume that $T_{theo}$ should be equal to the minimum bid at any given moment. However, in practice this may not consistently yield an informative price (i.e. one that gives customers and/or potential customers information useful to formulating their bids and bidding strategies) since the closer $B_n$ is to $S_{min}$, the less room there is in which to express supply vs. demand information (e.g., fluctuations in demand with respect to supply). In some embodiments, however, $B_n$ may be used as a minimum value of $T_{theo}$.

In some embodiments, a method for calculating $T_{theo}$ may include the following operations:
  Removing outliers from the existing (e.g., running and open) bids. In some embodiments, outliers may be defined as bids that are greater than a given threshold, where the threshold is calculated based on the interquartile range of the bids:

$$threshold = Q_3 + 1.5 * IQR$$

Fitting the resulting data to a Poisson distribution, i.e. calculating $\lambda_{Poisson}$.
  Setting $T_{theo}$ to a value equal to the higher of: one standard deviation below $\lambda_{Poisson}$ and $B_n$, as follows.

$$T_{theo} = \max((\lambda_{Poisson} - \sqrt{\lambda_{Poisson}}), B_n)$$

In this example, the interquartile range (IQR) may be defined as follows:

$$IQR = Q_3 - Q_1$$

where $Q_3$ and $Q_1$ are the 3$^{rd}$ and 1$^{st}$ quartiles of the range of bid amounts, respectively. In some embodiments, the method used for calculating quartiles may be that illustrated in the table below and described by John Tukey (e.g., in *Understanding Robust and Exploratory Data Analysis*, edited by David C. Hoaglin, Frederick Mosteller, and John W. Tukey, 1983), as it generally produces smaller IQRs than other methods. In some embodiments, the use of smaller IQRs may produce more stringent criteria for outlier removal and result in overall smaller target prices.

| $Q_1$, n odd | $Q_1$, n even | $Q_3$, n odd | $Q_4$, n even |
|---|---|---|---|
| $\dfrac{n+3}{4}$ | $\dfrac{n+2}{4}$ | $\dfrac{3n+1}{4}$ | $\dfrac{3n+2}{4}$ |

One embodiment of a method for determining a theoretical bid threshold is illustrated by the flow diagram in FIG. 5. As illustrated in this example, the method may include the system (or service) accessing data representing the bid amounts included in a set of existing resource requests (e.g., resource requests for which resources are currently allocated and/or running, and any open resource requests), as in 510. As described above, the method may include removing any outliers from the collection of bid amounts, as in 520. The method may also include fitting the remaining data to a Poisson distribution, as in 530 and calculating $\lambda_{Poisson}$ for the distribution, as in 540.

As illustrated in this example, if the lowest bid amount in the collection of bid amounts is greater than one standard deviation below $\lambda_{Poisson}$ (shown as the positive exit from 550), the method may include setting the theoretical bid threshold equal to the lowest bid amount, as in 560. If not (shown as the negative exit from 550), the method may include setting the theoretical bid threshold to an amount equal to one standard deviation below, $\lambda_{Poisson}$, as in 570. Note that while the discussion above and the example illustrated in FIG. 5 describe the use of a Poisson distribution for determining a theoretical bid threshold, in other embodiments, the bid amounts included in a collection of existing bids may be fit to other distributions in order to predict the value of the bid threshold below which requests will not be granted when demand exceeds supply, or another method may be used to predict such a value.

Figure 6:
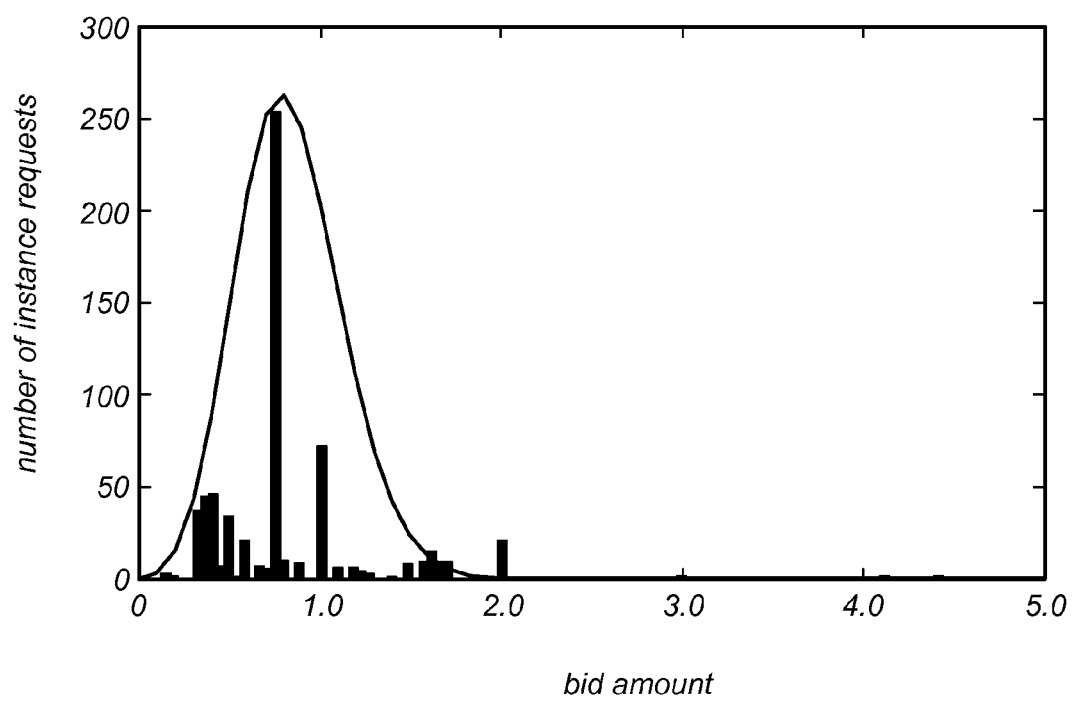
FIGS. 6 and 7 illustrated two example bid histograms, fitted to Poisson distributions.
Figure 7:
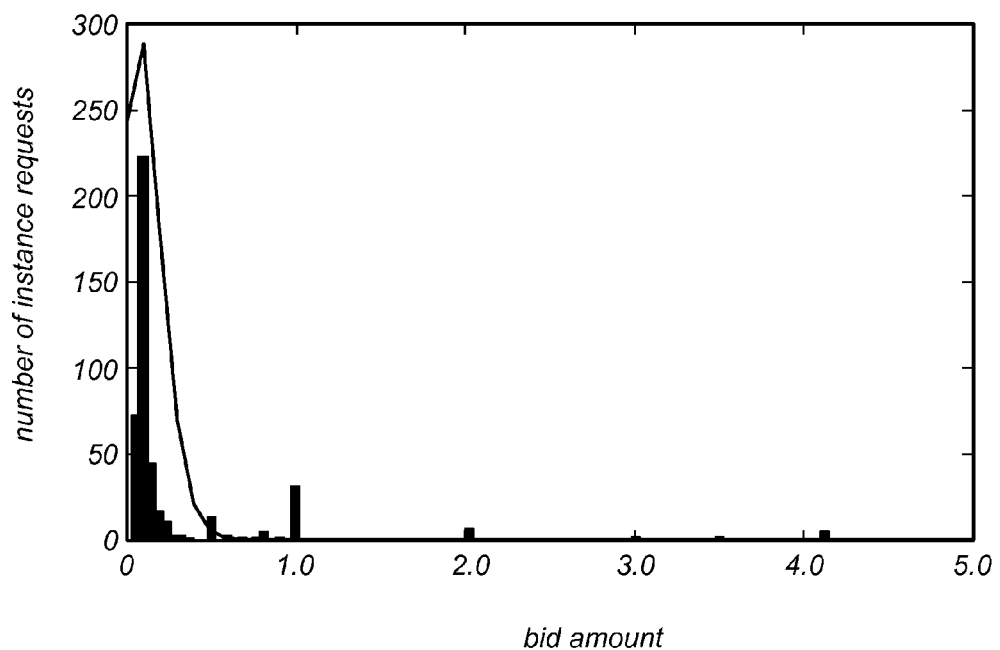

In some embodiments, the Poisson distribution may be well suited for modeling the bid distributions due to its positive skew, since bids are often bunched towards $S_{min}$, reflecting the customer's desire to obtain the lowest price for resource usage. FIGS. 6 and 7 illustrated two example bid histograms, fitted to Poisson distributions. In each of the figures, the number of resource instances requested in existing requests that include a given bid amount is plotted for bid amount values ranging from $0.00 to $5.00 per instance hour. In FIG. 6, the peak of the distribution is at a bid amount of about $0.75 per instance hour, while in FIG. 7, the peak of the distribution is at a bid amount of about $0.10 per instance hour.

As previously noted, to enable the calculation of a representative spot price given that demand is less than supply, the systems described herein may calculate $T_{theo}$, a prediction of what the price will be when the demand curve crosses the supply curve, and then set the price to a value between $S_{min}$ and $T_{theo}$, depending on how close demand is to supply. In some embodiments, if demand is close to zero, the price may be set to a value close to $S_{min}$, and if demand is close to supply, the price may be set to a value close to $T_{theo}$, with the price being set using a smooth, continuous function in between. In some embodiments, this approach may provide useful demand vs. supply information to customers and/or potential customers.

Figure 8:
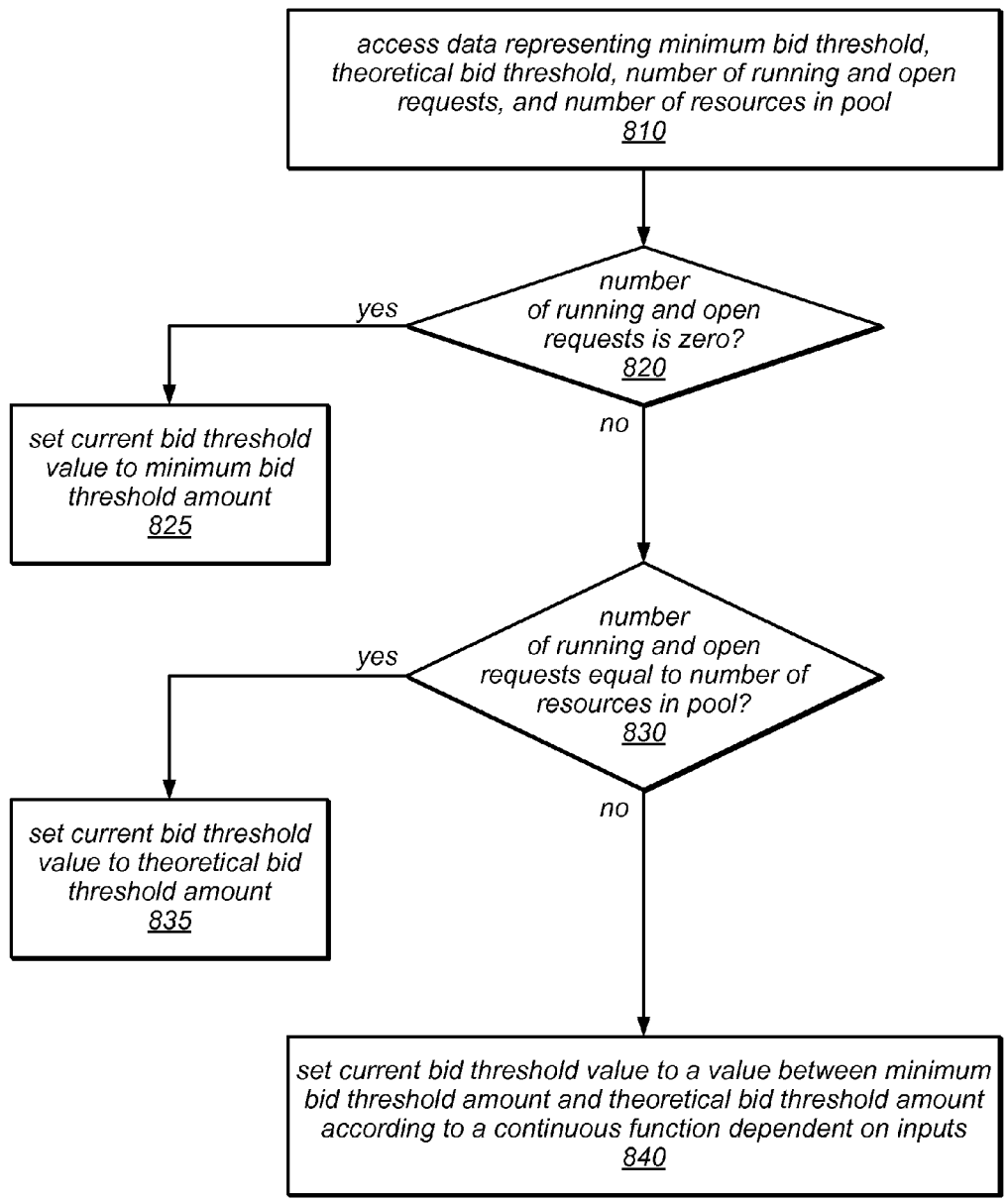
FIG. 8 is a flow diagram illustrating one embodiment of a method for determining a current bid threshold (or spot price) during non-contention, dependent on a theoretical bid threshold.

One embodiment of a method for determining a current bid threshold (which may be equivalent to a current spot price) during non-contention, dependent on a theoretical bid threshold, is illustrated by the flow diagram in FIG. 8. As illustrated in this example, the method may include the system (or service) accessing data representing a minimum bid threshold, a theoretical bid threshold, the number of existing resource requests (e.g., resource requests for which resources are currently allocated and/or running, and any open resource requests), and the number of resources in the pool (i.e. the supply), as in 810.

In this example, if the number of existing resource requests (running and open) is zero (shown as the positive exit from 820), the method may include setting the current bid threshold value equal to the minimum bid threshold amount (as in 825). As previously noted, a minimum bid threshold amount (i.e. a minimum spot price) for a resource pool may in some embodiments be a fixed and/or default amount that is based on operating costs or other considerations. If the number of existing resource requests (running and open) is non-zero (shown as the negative exit from 820), but the number of existing resource instance requests (running and open) is equal to the number of resource instances in the resource pool (shown as the positive exit from 830), the resource pool may be operating at full capacity (although not yet under contention for the pooled resources), and method may include setting the current bid threshold value equal to the theoretical bid threshold amount (as in 835). Otherwise (shown as the negative exit from 830), the method may include setting the current bid threshold value to a value between the minimum bid threshold amount and the theoretical bid threshold amount, e.g., according to a continuous function that is dependent on the inputs described above (as in 840). Note that in other embodiments, if the number of existing resource instance requests (running and open) is equal to the number of resource instances in the resource pool (i.e. if the resource pool is operating at capacity), the system (or service) may be configured to apply a contention pricing model when setting the current bid threshold value, rather than setting the current bid threshold value equal to the theoretical bid threshold amount or applying a non-contention pricing model to determine the current bid threshold value.

A variety of continuous functions may be suitable for use in setting a current bid threshold value to a value between the minimum bid threshold amount and the theoretical bid threshold amount, in different embodiments. For example, in some embodiments, the function below may be employed.

$$f_{inv} = S_{min} + \left( \frac{1}{(C-n+1)^k} - \frac{1}{(C+1)^k} \right) \left( \frac{1}{1 - \frac{1}{(C+1)^k}} \right) (T_{theo} - S_{min})$$

Figure 9:
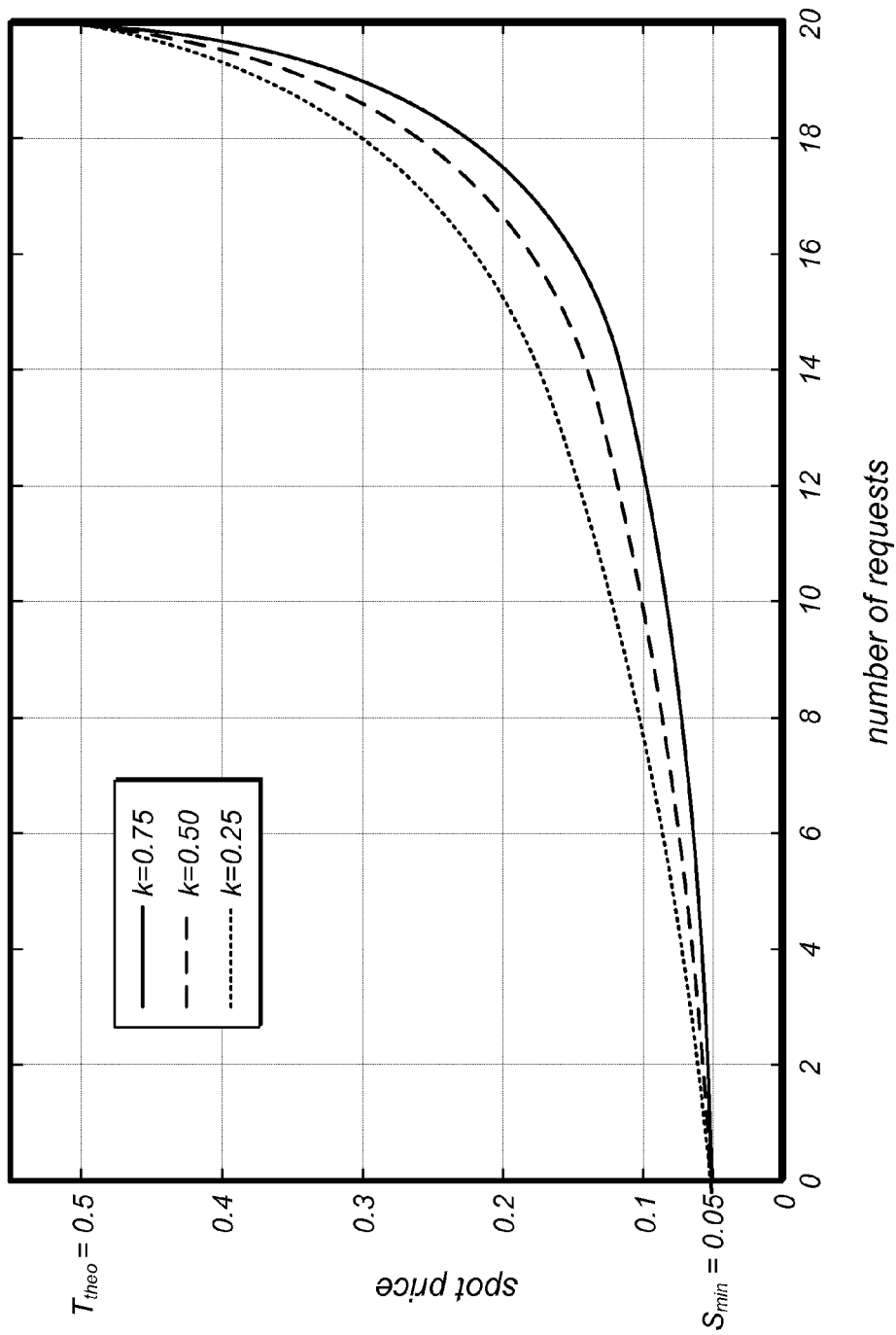
FIG. 9 illustrates the shape of function for determining a current bid threshold (or spot price) using three different values of k, according to one embodiment.

The shape of function $f_{inv}$, shown above, is illustrated in FIG. 9 for three different values of k (e.g., 0.25, 0.5, and 0.75). In this example, the value of $S_{min}$ is 0.05, the value of $T_{theo}$ is 0.5, and the value of C (the total capacity of the resource pool) is 20. As illustrated in FIG. 9, this function exhibits an early rise (where n is close to zero). It is also compatible with the relatively square bid profiles that may be typical in the described systems.

Other functions that may be suitable for use in setting a current bid threshold value to a value between the minimum bid threshold amount and the theoretical bid threshold amount, in different embodiments, are illustrated below.

$$f_{ramp} = S_{min} + \left(\frac{n}{c}\right)^k (B_n - S_{min})$$

$$f_{level} = S_{min} + \left(\frac{1 - \cos\left(\frac{\pi n}{c}\right)}{2}\right)^k (B_n - S_{min})$$

In some embodiments, as demand increases and approaches the supply, the prediction of $T_{theo}$ (calculated as described herein) may become a self-fulfilling prophecy. However, when demand decreases to a level below the supply, the value of $T_{theo}$, which may be based solely on existing (e.g., running and open) bids, may not be equal to the last spot price when the demand was greater than the supply. Left untreated, this may in some cases cause the price to jump as demand decreases to a level below the supply. In some embodiments, to maintain parity with contention pricing, the system may initialize an effective target price to the last contention price and use percentage-wise demand velocity $$\vec{D} = \frac{\Delta D}{C}$$

to control the convergence toward $T_{theo}$ (which may be higher or lower than the last contention price). In other words, the system may target $T_{theo}$, but may only converge to this value as fast as the market moves. In some embodiments, this tempering may help to manage the transition between contention and non-contention pricing models and to maintain the flow of supply vs. demand information to customers and/or potential customers.

Figure 10:
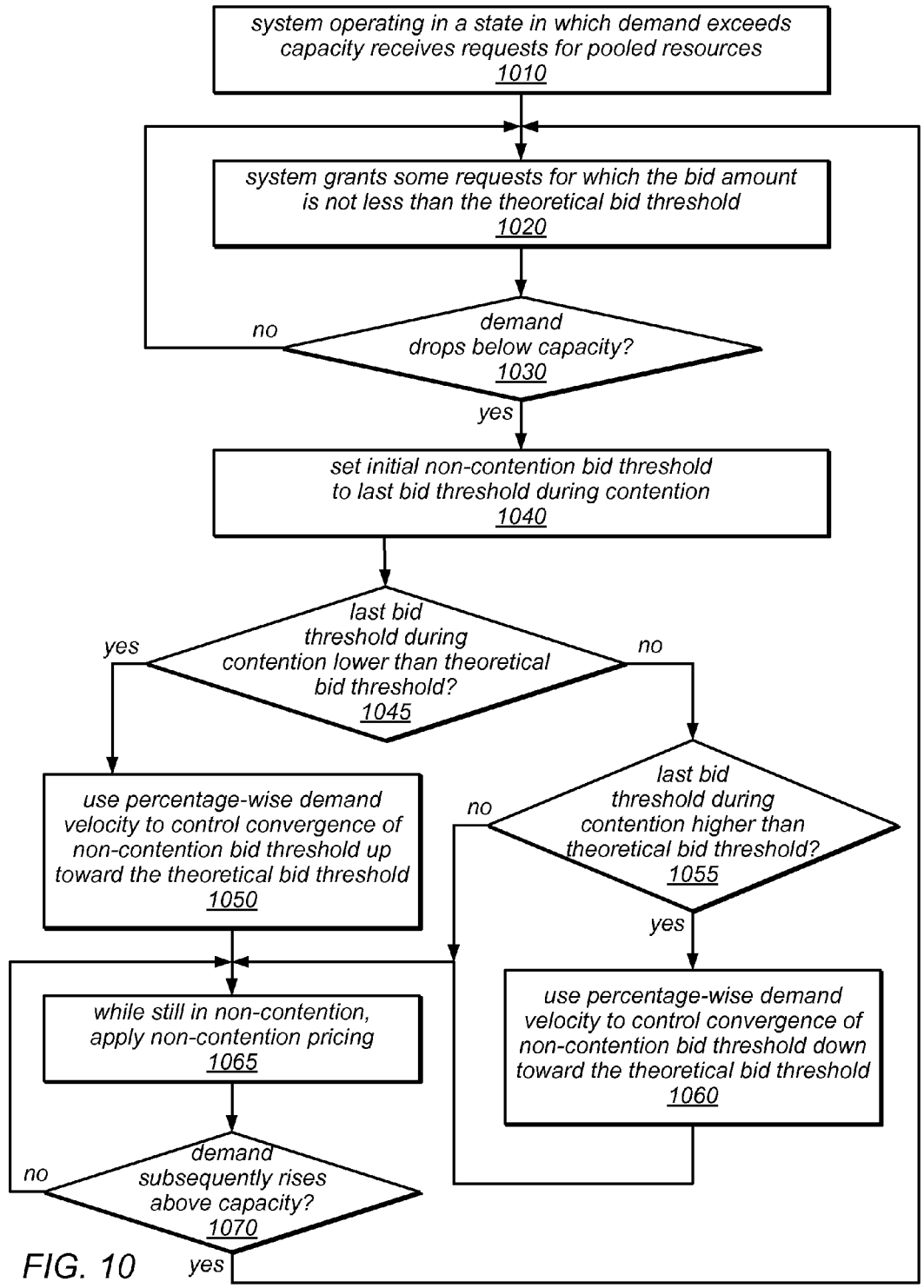
FIG. 10 is a flow diagram illustrating one embodiment of a method for tempering price down-swings when determining pricing for resources in a resource pool.

One embodiment of a method for tempering price downswings when determining pricing for resources in a resource pool is illustrated by the flow diagram in FIG. 10. In this example, it may be assumed that the system (or service) is initially operating in a state in which demand exceeds capacity, i.e. that the system (or service) is operating under contention for pooled resources. As illustrated in FIG. 10, the method may include the system (or service) receiving requests for pooled resources, as in 1010. As in previous example, each of the requests may include a bid amount, and may also include an identifier of the client (requestor), an identifier of a resource pool, an identifier the type of resource (or resource instance) requested, an indication of the number of resource instances being requested, and/or other information.

As illustrated at 1020 in this example, while the resource pool is in a contention state, the method may include granting some (but not necessarily all) requests for which the bid amount is not less than the theoretical bid threshold (i.e. the bid amount that was predicted to be equal to the threshold bid amount below which requests are not granted when in a contention state). For example, in some embodiments, resource requests may be granted using a second item auction mechanism or another contention pricing mechanism, according to the respective bid amounts in each of the existing (running and open) resource requests. In the example illustrated in FIG. 10, as long as the resource pool is in a contention state (shown as the negative exit from 1030), resource requests may be granted (or not granted) according this or another contention pricing model.

If, at some point, the demand for the resources in the pool drops below the capacity such that the resource pool is no longer in a contention state (shown as the positive exit from 1030), the method may include setting the initial non-contention bid threshold value equal to the last bid threshold determined while the resource pool was in a contention state (as in 1040). If the last bid threshold during contention is lower than the current theoretical bid threshold (shown as the positive exit from 1045), the method may include using percentage-wise demand velocity to control the convergence of the non-contention bid threshold upward toward the theoretical bid threshold (as in 1050), assuming the resource pool remains in non-contention while this convergence takes place. Similarly, if the last bid threshold during contention is higher than the current theoretical bid threshold (shown as the negative exit from 1045 and the positive exit from 1055), the method may include using percentage-wise demand velocity to control the convergence of the non-contention bid threshold downward toward the theoretical bid threshold (as in 1060), assuming the resource pool remains in non-contention while this convergence takes place. Once the non-contention bid threshold reaches the theoretical bid threshold through convergence (or if the last bid threshold during contention was equal to the current theoretical bid threshold, shown as the negative exit from 1045 and the negative exit from 1055), the method may include applying the non-contention pricing mechanisms described herein while the resource pool remains in non-contention (as in 1065).

If the demand for resources subsequently rises above capacity, shown as the positive exit from 1070, the method may include granting some (but not necessarily all) requests, according to the contention pricing mechanism employed by the system (or service). This is illustrated in FIG. 10 by the feedback loop from 1070 to 1020. If the demand for the pooled resources remains below capacity (shown as the negative exit from 1070), the method may include continuing to apply the non-contention pricing mechanisms described herein while the system remains in non-contention (as in 1065). For example, the non-contention bid threshold may be reduced in response to a subsequent decrease in demand for the pooled resources (e.g., using the techniques described herein for adjusting the non-contention bid threshold based on supply and demand), or may be raised in response to a subsequent increase in demand (again, using the techniques described herein for adjusting the non-contention bid threshold based on supply and demand).

FIGS. 11-14 illustrate the behavior of the non-contention pricing models described herein for a variety of example supply vs. demand scenarios, according to various embodiments. In each of these examples, the resource pool is operating largely in a non-contention state, except for three spikes during which demand exceeds capacity. Note that a standard pricing model would produce the identical price curve for each scenario despite their differing demands while operating in a non-contention state. Therefore the resulting standard price curve is illustrated only in FIG. 11. The price curves resulting from the use of the new pricing model, however, reflect the differing non-contention demand scenarios illustrated in these figures.

Figure 11:
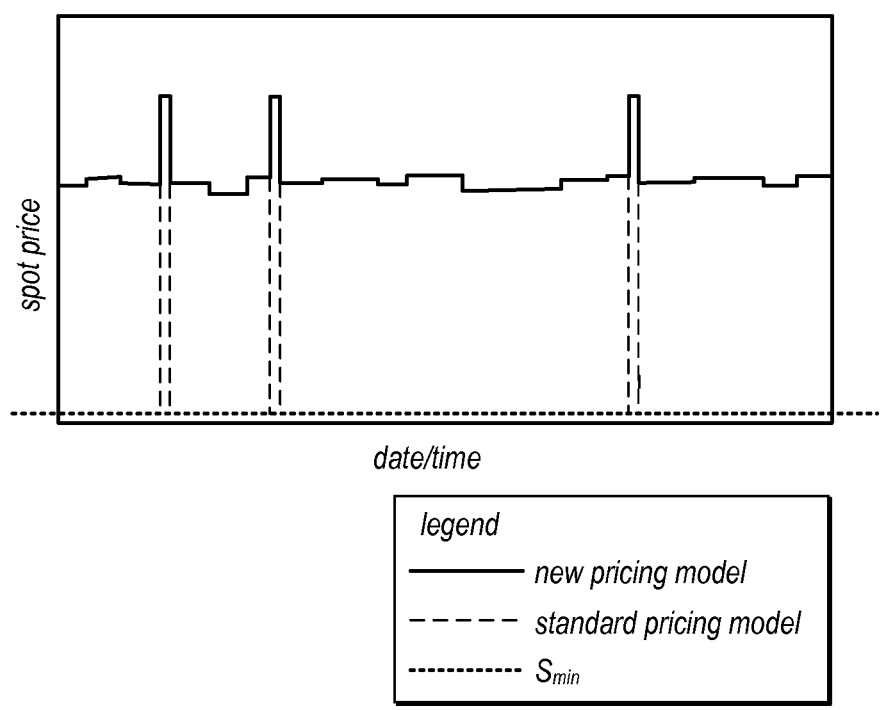
FIGS. 11-14 illustrate the behavior of the non-contention pricing models described herein for a variety of supply vs. demand scenarios, according to various embodiments.
Figure 12:
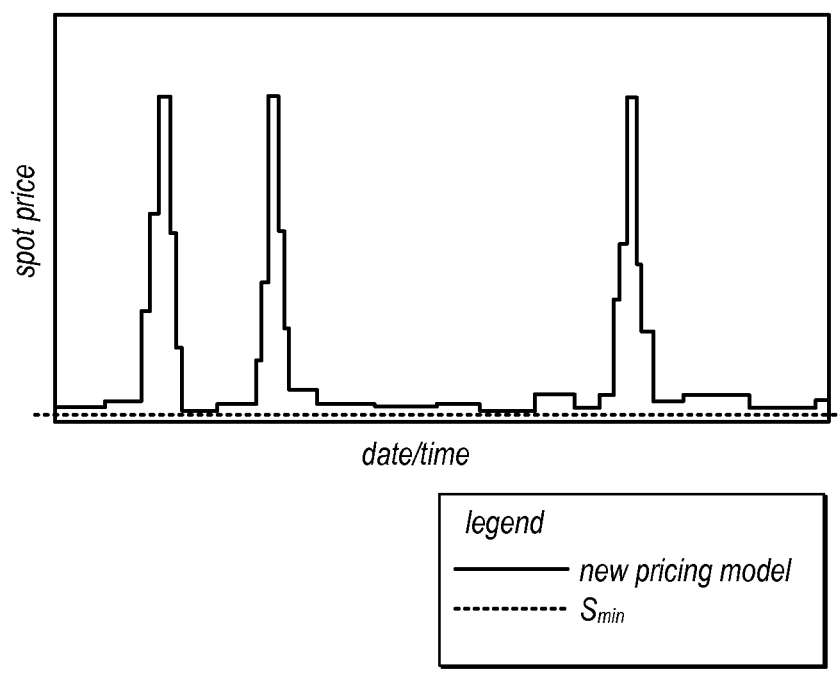

For example, FIG. 11 illustrates a scenario in which the demand for resources during the non-contention periods is very close to the available supply. In this scenario, under a standard pricing model, the spot price remains at the minimum spot price except in the few cases in which the demand exceeds the supply, at which point the price spikes (e.g., according to a second item auction or other contention pricing model). In this scenario, the new model may generate a price curve in which the spot price is close to the theoretical bid threshold during the non-contention periods, reflecting that the demand is close to the supply during these times. In this example, the differences between the spot prices during the non-contention periods and at the points at which demand exceeds capacity are small, reflecting the relatively small change in demand between these periods. FIG. 12 illustrates a scenario in which the demand for resources is generally low (relative to supply), except at the points during which demand exceeds supply. In this scenario, the new pricing model may generate a price curve in which the spot price is close to the minimum spot price during the non-contention periods, reflecting that the demand is low during these times. In this example, the differences between the spot prices during the non-contention periods and at the points at which demand exceeds capacity are large, reflecting the relatively large change in demand between these periods. Note, however, that the new model produces a price curve in which these large changes in the spot price are implemented as a series of several smaller price changes, using the techniques described herein.

Figure 13:
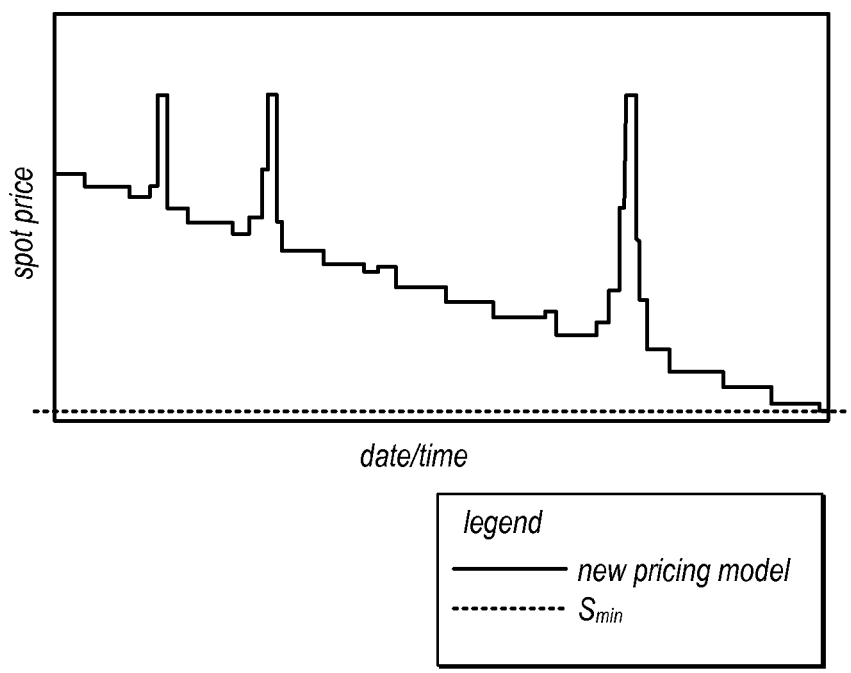
Figure 14:
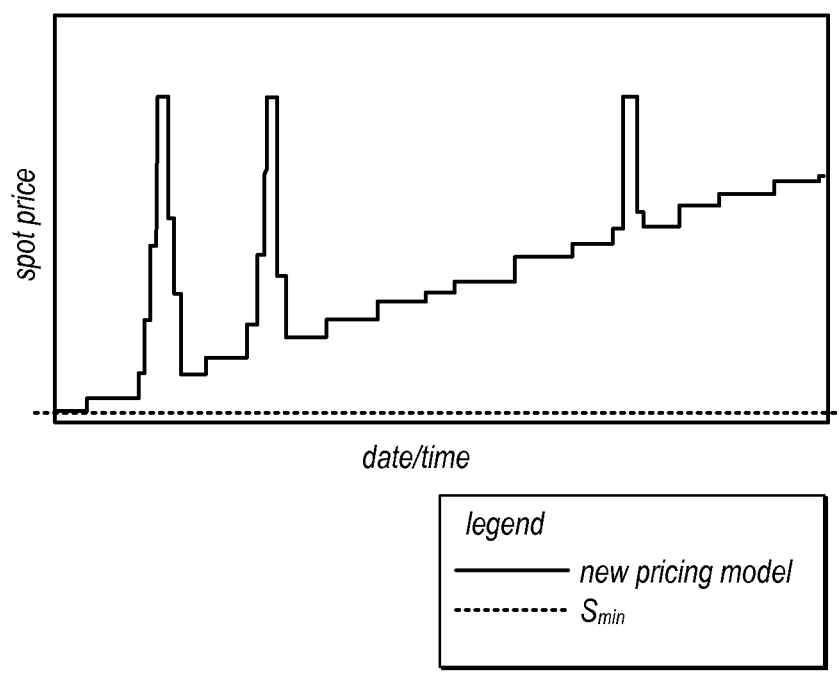

FIG. 13 illustrates a scenario in which the demand for resources during the non-contention periods diminishes over time. In this scenario, the new pricing model may generate a price curve in which the spot price is initially close to the theoretical bid threshold (reflecting that the demand that is close to the supply), but is adjusted downward as the demand decreases over time (reflecting that demand has dropped off relative to supply). FIG. 14 illustrates a scenario in which the demand for resources during the non-contention periods increases over time. In this scenario, the new pricing model may generate a price curve in which the spot price is initially close to the minimum spot price (reflecting that the demand that is low relative to the supply), but is adjusted upward as the demand increases over time (reflecting that demand has increased relative to supply). In these two examples, the relative differences between the supply and demand over time are reflected in the differences between the spot prices during times of contention and non-contention.

In some embodiments, supply vs. demand information may be very valuable for a customer with specific goals that they wish to achieve using spot instances. For example, this information may help the customer determine the instance types, the number of instances, the target resource pools, the timing of their requests, and the maximum bid amounts that are best suited for their applications and for saving them money.

For example, a customer who has a one-off data crunching job (e.g., a compute-intensive job) may bid relatively low on five instances in a pool of high-performance computing resources (e.g., computing resources that include a large number of fast processor cores) with relatively flat demand, rather than bidding relatively high on twenty instances in a more volatile resource pool of medium-performance computing resources, where the customer's maximum bid may come into effect frequently. In some cases, this job may complete in the same amount of time when executed on resources in the two pools, but it may be performed at a lower, or least more predictable, cost, when executed on the resources in the higher-performance resource pool.

In another example, a customer who has long-term, but highly interruptible, processing needs may submit several relatively low, persistent bids in a number of pools exhibiting generally lower, but potentially volatile, demand. Supply vs. demand information may in some cases help the customer control the number of resource instances that would be employed at any given time to achieve maximum cost savings.

In yet another example, a customer who has periodic, resource-intensive processing needs may analyze recurring lulls in customer demand in order to time resource requests accordingly (e.g., so that they execute in processing "bursts"), which may maximize cost savings.

Figure 15:
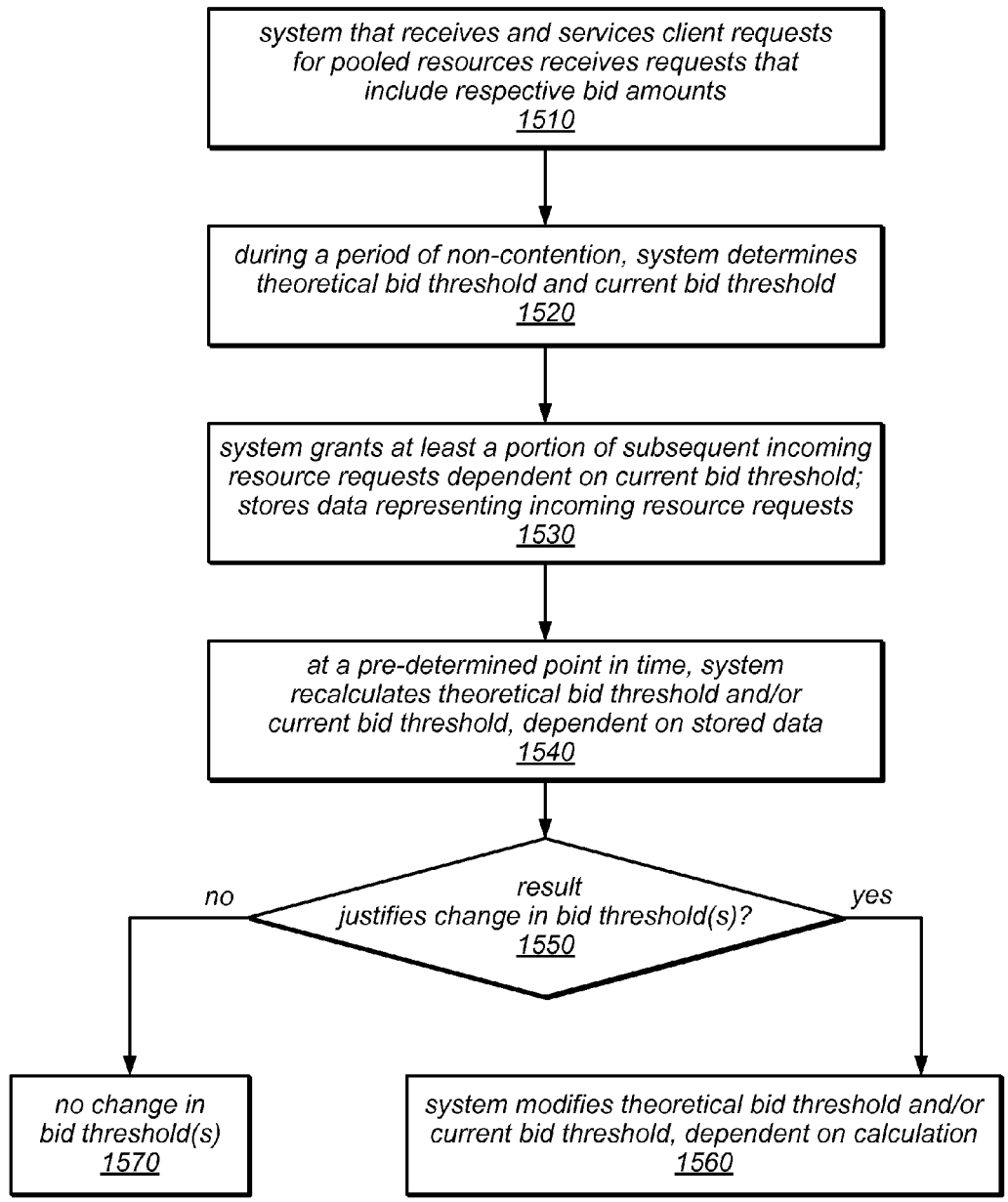
FIG. 15 is a flow diagram illustrating one embodiment of a method for adjusting a current bid threshold (or spot price) over time.

One embodiment of a method for adjusting a current bid threshold (which may be equivalent to a current spot price) over time is illustrated by the flow diagram in FIG. 15. As illustrated at 1510 in this example, the method may include a system that receives and services client requests for pooled resources receiving requests that include respective bid amounts. As in other examples, each of the requests may also include an identifier of the client (requestor), an identifier of a resource pool, an identifier the type of resource (or resource instance) requested, an indication of the number of resource instances being requested, and/or other information.

As illustrated at 1520 in this example, during a period of non-contention, the system may determine a theoretical bid threshold and a corresponding current bid threshold, e.g., using the techniques described herein. The system may grant at least a portion of subsequent incoming resource requests dependent on the current bid threshold, as in 1530. In some embodiments, the system may also store data representing the incoming resource requests for further analysis. For example, at pre-determined points in time (e.g., at periodic intervals), the system may recalculate the theoretical bid threshold and/or the current bid threshold, dependent on the stored data (as in 1540).

If the results of the recalculations of the theoretical bid threshold and/or the current bid threshold justify a change in one or both of these bid threshold(s), shown as the positive exit from 1550, the system may modify one or both of these values, dependent on the results of the recalculations (as in 1560). For example, in some embodiments, the system may be configured to modify one or both of these values only if a change in the value(s) indicated by the recalculation(s) is greater than a pre-determined absolute value, relative value, or percentage change, or only if a pre-determined amount of time has passed since the last change in the value(s), according to various pricing policies. If the results of the recalculations of the theoretical bid threshold and/or the current bid threshold do not justify a change in one or both of these bid threshold(s), shown as the negative exit from 1550, there may be no changes in these value(s) in response to the recalculations, as in 1570.

As previously noted, in some embodiments, stored request data (including bid amounts) may be analyzed on a periodic basis to recalculate various bid thresholds and/or spot prices, as described herein. For example, such an analysis may be performed once every minute. In other embodiments, such an analysis may be performed in response to receiving a resource request, or in response to having received a pre-determined number of requests for resources in a particular resource pool. In some embodiments, bid thresholds and/or spot prices may be adjusted less frequently than the analysis is performed (e.g., no more often than once every five minutes) regardless of how often an analysis of the request data is performed. This may avoid excessive price thrashing during periods of non-contention.

In some embodiments, the system may be configured to phase in the non-contention pricing model described herein relatively gradually or more aggressively by controlling (and/or adjusting) the bend in the "elbow" of the non-contention pricing function employed in the system (e.g., via adjustments to k, in the example pricing function above).

Figure 16:
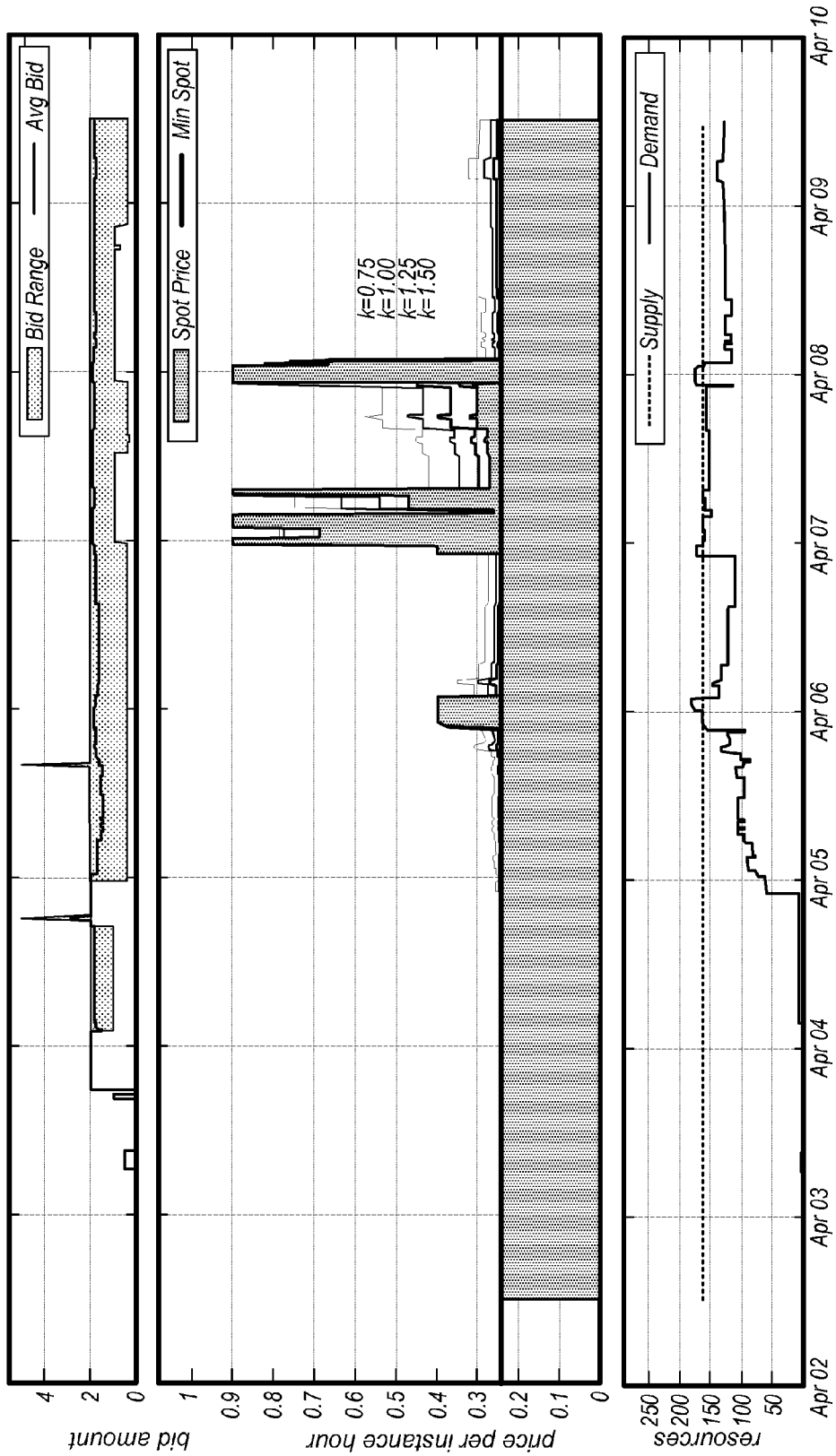
FIG. 16 illustrates an example of the behavior of the new pricing models described herein during times of contention and non-contention, according to one embodiment.

FIG. 16 illustrates an example of the behavior of the new pricing models described herein during times of contention and non-contention, according to one embodiment. In this example, three stacked graphs are used to illustrate the changes in supply and demand for a pool of resource instances over a one-week time period (the same time period depicted in FIG. 1), the price curves that would have resulted from the new pricing model over that time period (for four different values of k), and the bidding behavior of clients during that time period. As in the example illustrated in FIG. 1, the bottom chart illustrates that the supply of resources was on the order of 160 resource instances during the time period depicted in the chart, and that the demand for those resources varied from near zero to between 160 and 200 resource instances. The resource pool was operating in a non-contention state for most of the week. More specifically, demand began very low, rose steadily from April $5^{th}$ to April $6^{th}$, and only exceeded supply for a few brief periods on or about April $6^{th}$ $7^{th}$, and $8^{th}$. After the initial rise in demand, demand levels remained above 100 resource instances for the rest of the week.

As illustrated by the middle chart in FIG. 16, the new pricing model produces price curves in which the price per instance hour is held to a non-contention minimum spot price of about $0.25 only during the time period in which demand was very low on April $4^{th}$. As demand increased from April $5^{th}$ to April $6^{th}$, the spot price is increased incrementally to reflect the increased demand during this period, even though the resource pool is still operating in a non-contention state. As illustrated by the four separate price curves in this example, the effect of the increased demand on the spot price (during non-contention) is greatest when the value of k is relatively low. When the value of k is relatively high, the effect of the increased demand on the spot price (during non-contention) is much lower.

As illustrated in FIG. 16, the spot price is further increased in response to demand exceeding supply on or about April $6^{th}$, according to a contention pricing model. However, when demand fell below supply later on April $6^{th}$, the spot price was not reduced back to the non-contention minimum spot price (as in the standard pricing model), but instead was only incrementally decreased to reflect the fact that demand was still relatively high. For the rest of the week, the spot price was adjusted incrementally using the non-contention pricing models described herein during all periods of non-contention, keeping the price well above the minimum spot price, in most cases. However, the price was allowed to spike during times of contention, according to the contention pricing model. The upper chart illustrates that over this time period, the range of bid amounts included in resource requests was generally between $0.25 and $2.00, and the average bid amount was typically slightly less than $2.00.

As illustrated in this example, the value of k may essentially dictate how much the relationship between supply and demand affects the spot price. In this example, for all values of k wherein $0.75 \le k \le 1.50$, the number of requests fulfilled and terminated may be identical. However, for $k \le 0.50$, where the relationship between supply and demand has a much greater effect on price, the shape of the pricing curve may change more dramatically in response to changes in demand. In some embodiments, this may provide customers and/or potential customers with useful insights into the changing relationships between supply and demand, which may enable them to better plan their bidding strategies.

Note that each of the techniques described herein may be employed independently and/or in various combinations, in different embodiments. For example, systems that provide services to clients (including access to pooled computing resources) and that receive, accept, and/or service requests on behalf of those clients may implement any or all of the techniques described herein for determining which and how many requests for resource instances are granted and/or terminated by the system (or service) as demand changes, and for determining the price that clients will be charged for the use of those resource instances if and when their requests are granted, in any combinations. As described herein, the techniques described herein for non-contention pricing may produce a much more informative price curve during periods of non-contention (which in some systems may be more than 90% of the time) than a standard non-contention pricing model. Given the choice between a service employing the standard, un-informative non-contention pricing model, and a service that more accurately reflects supply vs demand information in its pricing, customers may be more likely choose the latter.

In some embodiments, the techniques described herein may be implemented by a system that provides access to pooled computing resources as a service. As described herein, clients of such a service may submit requests for the use of one or more instances of a computing resource that include an indication of the maximum amount the client is willing to pay for the use of those resource instances. In some embodiments, the techniques described herein for determining how resource instances are allocated to the requesting clients (e.g., which requests to grant) and for determining the price that clients will be charged for the use of those resource instances (if and when their requests are granted) may be implemented by a Web server (or an admission control subsystem or other component thereof). In general, any or all of the techniques described herein for managing resource requests and pricing models on behalf of a pool of computing resources may be performed by and/or implemented in an admission control module that is a component of a Web server. In some embodiments, the described systems may provide services over the Internet. In other embodiments, these techniques may be performed by and/or implemented in an admission control module or a similar component of another type of system that provides services to clients, and that is configured to receive, accept, and/or requests for pooled resources on behalf of those clients.

Figure 17:
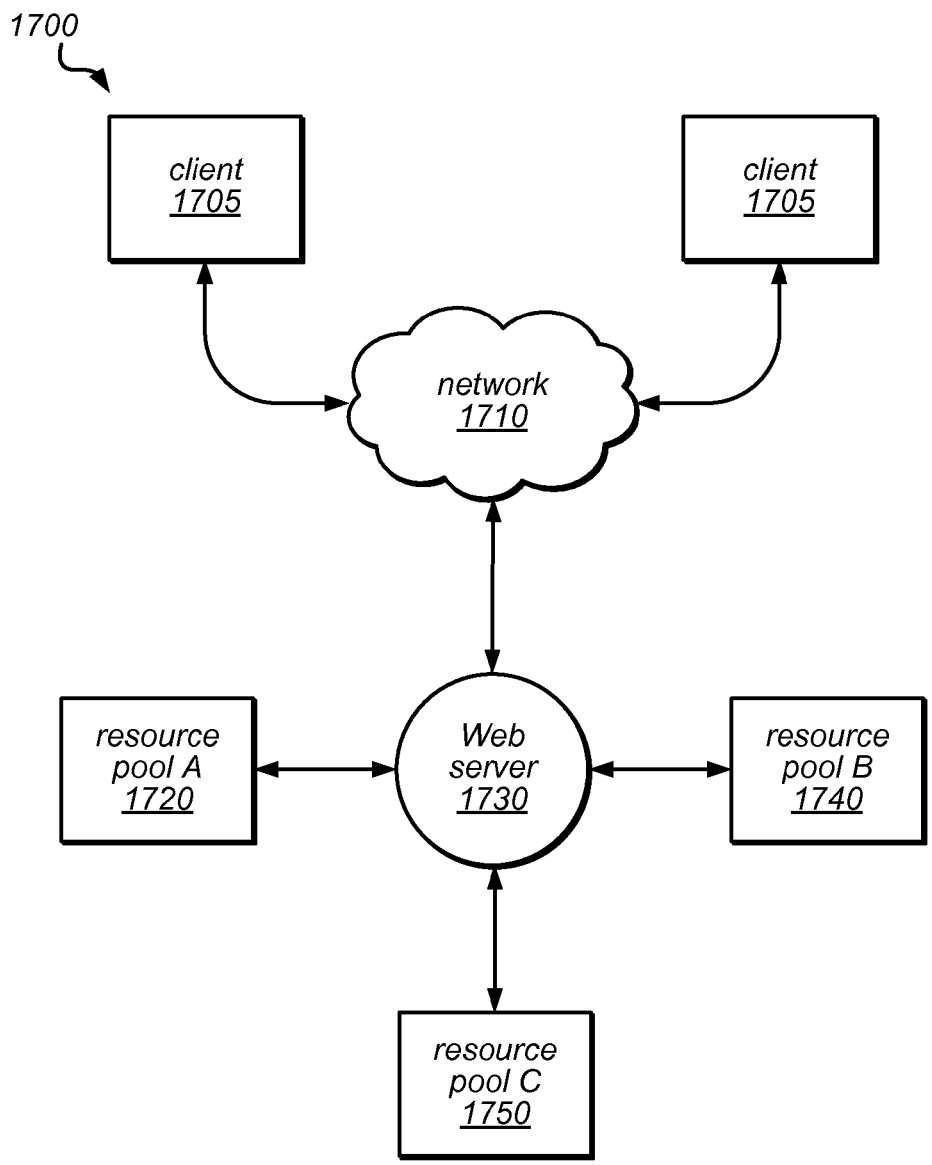
FIG. 17 is a block diagram illustrating components of a system that provides computing resources to clients, according to one embodiment.

For example, various techniques described herein may be employed in local or remote systems, including systems that provide computing services to clients (e.g., users or subscribers) over the Internet or over other public or private networks, such as virtual private networks and connections to services in a virtual private cloud (VPC) environment. FIG. 17 illustrates a block diagram of a system that provides various Web-based computing services (including access to pooled computing resources) to clients, according to one embodiment. In this example, system 1700 includes one or more clients 1705. In this example, the clients 1705 may be configured to interact with a Web server 1730 via a communication network 1710.

As illustrated in this example, the Web server 1730 may be configured to process requests from clients 105 for resource instances from various resource pools, such as resource pool A (1720), resource pool B (140), and resource pool C (150), and to provide access to those resource instances to at least a portion of the clients 1705 in a spot market. In some embodiments, the different pools may include different types of computing resources (e.g., storage resources and/or computation resources), and/or computing resources having different capacities and/or performance specifications (e.g., resource instances that include different amounts of memory, different numbers of processor cores, processors with different levels of performance, different ratios between memory and CPU performance, and/or different amounts of storage available for customer use). As described herein, in various embodiments, the resource requests may include an identifier of the client (requestor), an identifier of a resource pool, an identifier the type of resource (or resource instance) requested, an indication of the number of resource instances being requested, a bid amount, and/or other information. In various embodiments, a component of Web server 1730 may be configured to determine whether a given resource pool, such as resource pool A, is operating in a non-contention state or a contention state, and to apply an appropriate pricing model to set the current bid threshold (or spot price) accordingly. As described herein, requests that include a bid amount that is not less the current bid threshold (or spot price) may be granted access to the requested resource instance(s).

In the example illustrated in FIG. 17, the clients 1705 may encompass any type of clients configured to submit resource requests to Web server 1730 via network 1710 on behalf of a user (subscriber) or a requesting application. For example, a given client 1705 may include a suitable version of a Web browser, or a plug-in module or other type of code module configured to execute as an extension to or within an execution environment provided by a Web browser. Alternatively, a client 1705 may encompass an application such as a database application, media application, office application, or any other application that may make use of the services and/or computing resources provided by Web server 1730. In some embodiments, such an application may include sufficient protocol support (e.g., for a suitable version of Hypertext Transfer Protocol (HTTP)) for generating and processing Web service and/or resource requests without necessarily implementing full browser support for all types of Web-based data. That is, client 1705 may be an application configured to interact directly with Web server 1730. In various embodiments, client 1705 may be configured to generate requests for Web services and/or computing resources according to a Representational State Transfer (REST)-style Web services architecture, a document or message-based Web services architecture, or another suitable Web services architecture. In some embodiments, client 1705 may be configured to provide access to Web-based services and/or computing resources to other applications in a manner that is transparent to those applications. For example, a client 1705 may be configured to integrate with an operating system to provide services and/or computing resources in accordance with a suitable variant of the service model described herein. However, the operating system may present a different service request interface to applications than that described herein.

In various embodiments, the communication network 1710 may encompass any suitable combination of networking hardware and protocols necessary to establish Web-based communications between clients 1705 and Web server 1730. For example, the communication network 1710 may generally encompass the various telecommunications networks and service providers that collectively implement the Internet. The communication network 1710 may also include private networks such as local area networks (LANs) or wide area networks (WANs) as well as public or private wireless networks. For example, both a given client 1705 and the Web server 1730 may be respectively provisioned within enterprises having their own internal networks. In such an embodiment, the communication network 1710 may include the hardware (e.g., modems, routers, switches, load balancers, proxy servers, etc.) and software (e.g., protocol stacks, accounting software, firewall/security software, etc.) necessary to establish a networking link between the given client 1705 and the Internet as well as between the Internet and Web server 1730. Note that in some embodiments, clients 1705 may communicate with Web server 1730 using a private network rather than the public Internet. For example, in some embodiments clients 1705 may be provisioned within the same enterprise as the resources that provide various services and/or computing resources to those clients. In such a case, clients 1705 may communicate with a server 1730 entirely through a private communication network (not shown).

Figure 18:
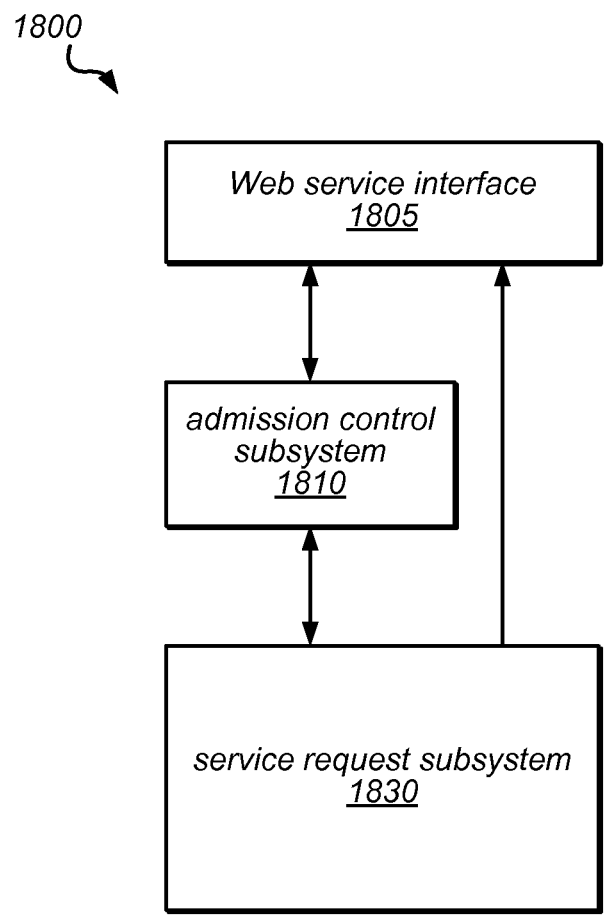
FIG. 18 is a block diagram illustrating subsystems of a system that provides computing resources to clients, according to one embodiment.

FIG. 18 is a block diagram illustrating a computing system 1800 that provides various Web-based services and/or computing resources to clients, according to some embodiments. For example, in some embodiments, computing system 1800 may implement a Web server, such as Web server 1730 illustrated in FIG. 17. In various embodiments, computer system 1800 maybe configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by computing system 1800 on behalf of various clients. As illustrated in this example, computing system 1800 may include a Web service interface 1805, an admission control subsystem 1810, and a service request subsystem 1830. In some embodiments, admission control subsystem 1810 may be configured to monitor the state of various resource pools managed by a computing system 1800, and may control which and how many requests for resource instances are granted and/or terminated by the system as demand changes.

In this example, Web services interface 1805 may be configured to receive requests for services and/or computing resources from various clients and to communicate with admission control subsystem 1810 to facilitate the performance of those services and/or allocation of those resources to at least a portion of the clients. For example, in some embodiments, admission control subsystem 1810 may be configured to determine which and/or how many resource requests to accept from various clients, and may communicate this information to a service request subsystem 1830. Service request subsystem 1830 may in turn be configured to allocate (or initiate allocation of) one or more resource instances to client whose requests are granted, and to return an indication of the allocation (and/or results of the use of the computing resources) to the client via Web services interface 1805. In some embodiments, admission control system 1810 may make decisions about admission control using the non-contention pricing models described herein. In some embodiments, Web service interface 1805 may utilize predefined instructions or communications, such as via defined application protocol interfaces (APIs), to communicate with admission control subsystem 1810 and/or other components of computing system 1800 on behalf of a client.

In some embodiments, admission control subsystem 1810 may be configured to determine whether the resource pools managed by computing system 1800 are operating in a contention state or a non-contention state, and to apply one or more of the techniques described herein in response to such a determination. For example, in response to determining that a resource pool is operating in a non-contention state, admission control subsystem 1810 may be configured to determine a current bid threshold below which resource requests will not be granted, based at least in part on the current demand for resource instances, the current capacity of the resource pool, the number of resource instances requested in existing requests, and/or the bid amounts included in those requests. In some embodiments, admission control subsystem may also be configured to terminate the use of one or more resource instances by a client in response to the current bid threshold being raised to a value higher than the bid amount included in that client's request for the one or more resource instances. In response to determining that a resource pool is operating in a contention state, admission control subsystem 1810 may be configured to determine a current bid threshold below which resource requests will not be granted using any of a variety of contention pricing models including, but not limited to, those described herein.

Note that in various embodiments, the components illustrated in FIGS. 17 and 18 may be implemented directly within computer hardware, as instructions directly or indirectly executable by computer hardware (e.g., a microprocessor or computer system), or as a combination of these techniques. For example, the components of the computing system 1800 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIG. 17 and/or FIG. 18.

It is contemplated that in some embodiments, any of the methods, techniques or components described herein may be implemented as instructions and data capable of being stored or conveyed via a computer-accessible medium. Such methods or techniques may include, for example and without limitation, various methods for determining which and how many requests for resource instances are granted and/or terminated by a computer system (or a service provided thereby) as demand changes, and for determining the price that clients will be charged for the use of those resource instances if and when their requests are granted, as described herein. Such instructions may be executed to perform specific computational functions tailored to specific purposes (e.g., processing requests received via a Web services interface, or returning feedback and/or results of servicing various requests) as well as higher-order functions such as operating system functionality, virtualization functionality, network communications functionality, application functionality, storage system functionality, and/or any other suitable functions.

Figure 19:
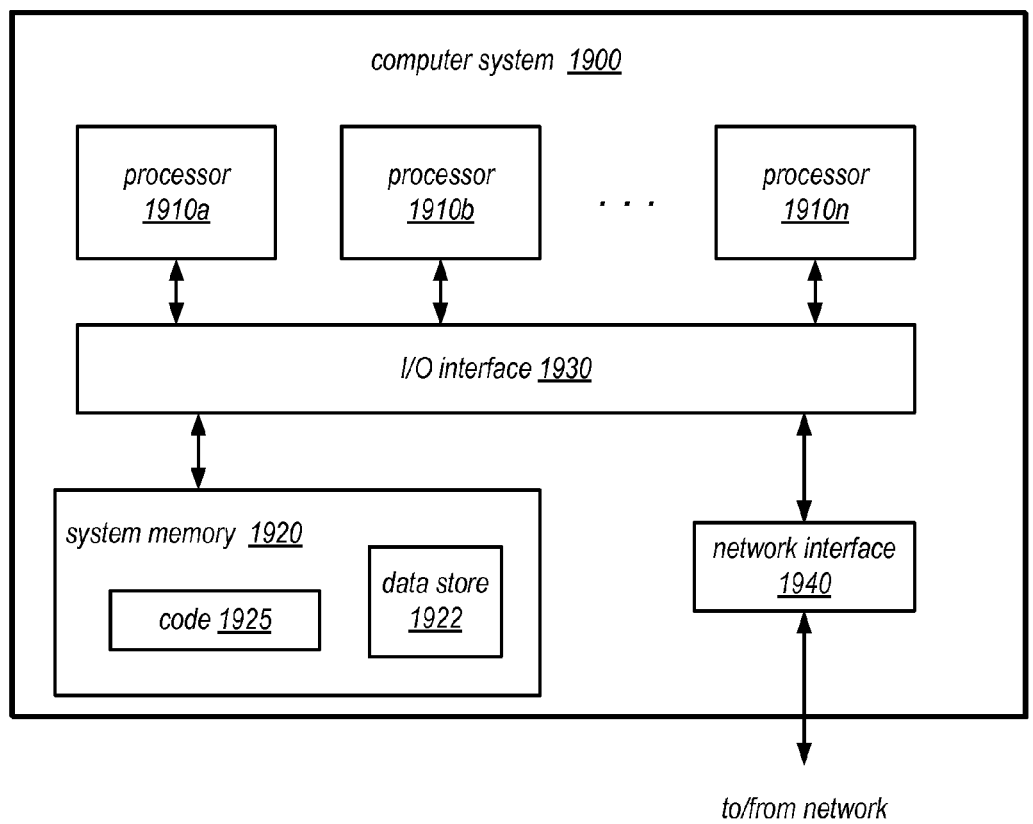
FIG. 19 illustrates one embodiment of a computer system that implements one or more of the techniques described herein.

One example embodiment of a computer system that includes computer-accessible media and that provides mechanisms for determining which and how many requests for resource instances are granted and/or terminated by the system (or service) as demand changes, and for determining the price that clients will be charged for the use of those resource instances if and when their requests are granted is illustrated in FIG. 19. In various embodiments, the functionality of any of the various modules or methods described herein may be implemented by one or several instances of computer system 1900. In particular, it is noted that different elements of the system described herein may be implemented by different computer systems 1900. For example, a computer system that supports the functionality described herein for determining which and how many requests for resource instances are granted and/or terminated by the system (or service) as demand changes, and for determining the price that clients will be charged for the use of those resource instances if and when their requests are granted may be implemented on the same computer system 1900 on which a client (through which a customer/subscriber may access the system) executes, or on another computer system 1900, in different embodiments. In another example, different subsystems (e.g., a Web service interface, an admission control subsystem, and a service request subsystem; or one or more load balancers, Web servers, and/or other components) may be implemented on or across multiple ones of the computing nodes, and each of the computing nodes may be similar to computer system 1900.

In the illustrated embodiment, computer system 1900 includes one or more processors 1910 coupled to a system memory 1920 via an input/output (I/O) interface 1930. Computer system 1900 further includes a network interface 1940 coupled to I/O interface 1930. In various embodiments, computer system 1900 may be a uniprocessor system including one processor 1910, or a multiprocessor system including several processors 1910 (e.g., two, four, eight, or another suitable number). Processors 1910 may be any suitable processor capable of executing instructions. For example, in various embodiments processors 1910 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1910 may commonly, but not necessarily, implement the same ISA.

System memory 1920 may be configured to store instructions (e.g., code 1925) and data (e.g., in data store 1922) accessible by processor 1910. In various embodiments, system memory 1920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for supporting determining which and how many requests for resource instances are granted and/or terminated by the system (or service) as demand changes, and for determining the price that clients will be charged for the use of those resource instances if and when their requests are granted according to various mechanisms described herein), are shown stored within system memory 1920 as code 1925. It is noted that in some embodiments, code 1925 may include instructions and data implementing desired functions that are not directly executable by processor 1910 but are represented or encoded in an abstract form that is translatable to instructions that are directly executable by processor 1910. For example, code 1925 may include instructions specified in an ISA that may be emulated by processor 1910, or by other code 1925 executable on processor 1910. Alternatively, code 1925 may include instructions, procedures or statements implemented in an abstract programming language that may be compiled or interpreted in the course of execution. As non-limiting examples, code 1925 may include code specified in a procedural or object-oriented programming language such as C or C++, a scripting language such as perl, a markup language such as HTML or XML, or any other suitable language.

In some embodiments, data store 1922 within system memory 1920 may store data representing various requests for resources, minimum bid amounts, theoretical bid thresholds, current bid thresholds, spot prices, resource specifications, resource pool parameters, and/or other data in various data structures suitable for implementing the techniques described herein.

In one embodiment, I/O interface 1930 may be configured to coordinate I/O traffic between processor 1910, system memory 1920, and any peripheral devices in the device, including network interface 1940 or other peripheral interfaces. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. Also, in some embodiments some or all of the functionality of I/O interface 1930, such as an interface to system memory 1920, may be incorporated directly into processor 1910.

Network interface 1940 may be configured to allow data to be exchanged between computer system 1900 and other devices attached to a network, such as other computer systems, for example. In various embodiments, network interface 1940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1920 may include a non-transitory, computer-readable storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 1900 via I/O interface 1930. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 1900 as system memory 1920 or another type of memory. A computer-accessible storage medium may generally be accessible via transmission media or signals such as electrical, electromagnetic, or digital signals, conveyed via a communication medium such as a network and/or a wireless link, such as may be implemented via network interface 1940.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
  performing by a computer that provides access to pooled computing resources to clients:
    receiving a plurality of requests for use of at least some of computing resources in a computing resource pool while supply of the computing resources exceeds demand for the computing resources, wherein each request comprises a respective bid amount;
    determining a value of a theoretical bid threshold for the computing resources in the computing resource pool, wherein the theoretical bid threshold value represents a predicted value of the lowest bid amount for which corresponding requests for the computing resources will be granted when demand for the computing resources exceeds supply for the computing resources, and wherein said determining the value of the theoretical bid threshold is dependent on the bid amounts included in the plurality of requests;
    repeatedly determining, based at least in part on the number of computing resources requested in the plurality of requests, the number of computing resources available in the computing resource pool, and the theoretical bid threshold, a value of a current non-contention bid threshold for the computing resource pool, wherein the current non-contention bid threshold value represents the lowest bid amount for which corresponding ones of the plurality of requests will be granted when supply for the computing resources exceeds demand for the computing resources, and wherein the current non-contention bid threshold value is less than the theoretical bid threshold value and greater than a predetermined minimum bid threshold value for the computing resources;
    identifying one or more of the plurality of requests for which the respective bid amount is not less than the determined value of the current non-contention bid threshold; and
    based at least in part upon the respective bid amounts of the identified one or more of the plurality of requests, granting access to the computing resources for the identified one or more of the plurality of requests.

2. The method of claim 1, further comprising:
  terminating the use of one or more resources of the resource pool previously granted in response to a request for resources for which the value of the included bid amount was less than the current non-contention bid threshold value.

3. The method of claim 1, wherein said determining the value of the theoretical bid threshold comprises:
  modeling the distribution of at least a portion of the bid amounts included in the plurality of requests; and
  calculating the value of the theoretical bid threshold dependent on the distribution.

4. The method of claim 1, further comprising:
  receiving one or more additional requests for resources in the resource pool while supply of the resources exceeds demand for the resources, wherein each additional request comprises a respective bid amount; and
  modifying the value of the current non-contention bid threshold for the resource pool, wherein said modifying comprises:
    determining a modified value of the theoretical bid threshold for the resource pool dependent on the bid amounts included in the one or more additional requests; and
    determining a modified value of the current non-contention bid threshold dependent on the modified value of the theoretical bid threshold.

5. A system, comprising:
  one or more processors; and
  a memory coupled to the one or more processors and storing program instructions that when executed by the one or more processors cause the one or more processors to perform:
    receiving a plurality of requests for use of at least some computing resources in a computing resource pool while supply of the computing resources exceeds demand for the computing resources, wherein each request comprises a respective bid amount;
    determining a value of a theoretical bid threshold for the computing resources in the computing resource pool, wherein the theoretical bid threshold value represents a predicted value of the lowest bid amount for which corresponding requests for the computing resources will be granted when demand for the computing resources exceeds supply for the computing resources, and wherein said determining the value of the theoretical bid threshold is dependent on the bid amounts included in the plurality of requests;

repeatedly determining, based at least in part on the number of computing resources requested in the plurality of requests, the number of computing resources available in the computing resource pool, and the theoretical bid threshold, a value of a current non-contention bid threshold for the computing resource pool, wherein the current non-contention bid threshold value represents the lowest bid amount for which corresponding ones of the plurality of requests will be granted when supply for the computing resources exceeds demand for the computing resources, and wherein the current non-contention bid threshold value is less than the theoretical bid threshold value and greater than a predetermined minimum bid threshold value for the computing resources;

identifying one or more of the plurality of requests for which the respective bid amount is not less than the determined value of the current non-contention bid threshold; and based at least in part upon the respective bid amounts of the identified one or more of the plurality of requests, granting access to the computing resources for the identified one or more of the plurality of requests.

6. The system of claim 5, wherein said determining the value of the current non-contention bid threshold is further dependent on the respective bid amounts in the plurality of requests.

7. The system of claim 5, wherein when executed by the one or more processors, the program instructions further cause the one or more processors to perform:

terminating the use of one or more resources of the resource pool previously granted in response to a request for resources for which the value of the included bid amount was less than the current non-contention bid threshold value.

8. The system of claim 5, wherein said determining the value of the theoretical bid threshold comprises:

modeling the distribution of at least a portion of the bid amounts included in the plurality of requests; and calculating the value of the theoretical bid threshold dependent on the distribution.

9. The system of claim 8, wherein the portion of the bid amounts included in the plurality of requests are modeled as a Poisson distribution.

10. The system of claim 5, wherein when executed by the one or more processors, the program instructions further cause the one or more processors to perform:

receiving one or more additional requests for use of at least some computing resources in the computing resource pool while supply of the computing resources exceeds demand for the computing resources, wherein each additional request comprises a respective bid amount; and modifying the value of the current non-contention bid threshold for the computing resource pool, wherein said modifying comprises:

determining a modified value of the theoretical bid threshold for the computing resource pool dependent on the bid amounts included in the one or more additional requests; and determining a modified value of the current non-contention bid threshold dependent on the modified value of the theoretical bid threshold.

11. A non-transitory, computer-readable storage medium storing program instructions that when executed on one or more computers cause the one or more computers to perform:

receiving a plurality of requests for use of at least some computing resources in a computing resource pool while supply of the computing resources exceeds demand for the computing resources, wherein each request comprises a respective bid amount;

determining a value of a theoretical bid threshold for the computing resources in the computing resource pool, wherein the theoretical bid threshold value represents a predicted value of the lowest bid amount for which corresponding requests for the computing resources will be granted when demand for the computing resources exceeds supply for the computing resources, and wherein said determining the value of the theoretical bid threshold is dependent on the bid amounts included in the plurality of requests;

repeatedly determining, based at least in part on the number of computing resources requested in the plurality of requests, the number of computing resources available in the computing resource pool, and the theoretical bid threshold, a value of a current non-contention bid threshold for the computing resource pool, wherein the current non-contention bid threshold value represents the lowest bid amount for which corresponding ones of the plurality of requests will be granted when supply for the computing resources exceeds demand for the computing resources, and wherein the current non-contention bid threshold value is less than the theoretical bid threshold value and greater than a predetermined minimum bid threshold value for the computing resources;

identifying one or more of the plurality of requests for which the respective bid amount is not less than the determined value of the current non-contention bid threshold; and based at least in part upon the respective bid amounts of the identified one or more of the plurality of requests, granting access to the computing resources for the identified one or more of the plurality of requests.

12. The storage medium of claim 11, wherein when executed on the one or more computers, the program instructions further cause the one or more computers to perform:

terminating the use of one or more resources of the resource pool previously granted in response to a request for resources for which the value of the included bid amount was less than the current non-contention bid threshold value.

13. The storage medium of claim 11, wherein said determining the value of the theoretical bid threshold comprises:

modeling the distribution of at least a portion of the bid amounts included in the plurality of requests; and calculating the value of the theoretical bid threshold dependent on the distribution.

14. The storage medium of claim 11, wherein when executed on the one or more computers, the program instructions further cause the one or more computers to perform:

receiving one or more additional requests for use of at least some computing resources in the computing resource pool while supply of the computing resources exceeds demand for the computing resources, wherein each additional request comprises a respective bid amount; and modifying the value of the current non-contention bid threshold for the computing resource pool, wherein said modifying comprises:

determining a modified value of the theoretical bid threshold for the computing resource pool dependent on the bid amounts included in the one or more additional requests; and determining a modified value of the current non-contention bid threshold dependent on the modified value of the theoretical bid threshold.

15. The storage medium of claim 14, wherein when executed on the one or more computers, the program instructions further cause the one or more computers to perform, in response to said modifying, granting one of the additional requests or terminating the use of one or more resources of the resource pool previously granted in response to a request for resources.

* * * * *